US011106455B2

(12) United States Patent
Myers et al.

(10) Patent No.: US 11,106,455 B2
(45) Date of Patent: Aug. 31, 2021

(54) INTEGRATION OF CONTAINERS WITH EXTERNAL ELEMENTS

(71) Applicant: MicroStrategy Incorporated, Vienna, VA (US)

(72) Inventors: Clayton Myers, Oak Hill, VA (US); Brett E. Morris, Arlington, VA (US); Andrew Scott Mears, Leesburg, VA (US); Shreyas Shah, Vienna, VA (US); Martin Lucius Bonica, Leesburg, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 16/542,058

(22) Filed: Aug. 15, 2019

(65) Prior Publication Data

US 2021/0049002 A1     Feb. 18, 2021

(51) Int. Cl.
*G06F 9/44*          (2018.01)
*G06F 8/656*        (2018.01)
*G06F 9/445*       (2018.01)
*G06F 8/71*          (2018.01)

(52) U.S. Cl.
CPC .............. *G06F 8/656* (2018.02); *G06F 8/71* (2013.01); *G06F 9/44505* (2013.01); *G06F 9/44526* (2013.01)

(58) Field of Classification Search
CPC ... G06F 8/71; G06F 8/656; G06F 8/76; G06F 8/65; G06F 9/44505
USPC ........................................................ 717/170
See application file for complete search history.

(56) References Cited

U.S. PATENT DOCUMENTS

| | | |
|---|---|---|
| 9,367,305 B1 | 6/2016 | Kumar et al. |
| 9,767,312 B2 | 9/2017 | Sahoo et al. |
| 9,928,210 B1 | 3/2018 | Zhang et al. |
| 9,959,104 B2 | 5/2018 | Chen et al. |
| 9,965,261 B2 | 5/2018 | Chen et al. |
| 10,002,247 B2 | 6/2018 | Suarez et al. |
| 10,007,509 B1 * | 6/2018 | Qureshi ................... G06F 8/65 |
| 10,169,023 B2 | 1/2019 | Ciano et al. |
| 10,191,778 B1 | 1/2019 | Yang et al. |
| 10,241,778 B2 | 3/2019 | Emeis et al. |
| 10,244,034 B2 | 3/2019 | Joshi et al. |

(Continued)

OTHER PUBLICATIONS

Title: Efficient service handoff across edge servers via docker container migration author: L Ma et al, published on 2017.*

(Continued)

*Primary Examiner* — Chameli Das
(74) *Attorney, Agent, or Firm* — Fish & Richardson P.C.

(57) ABSTRACT

Methods, systems, and apparatus, including computer programs encoded on computer-storage media, for integration of containers with external elements. In some implementations, a server environment is provided using one or more containers. The one or more containers include a first container that is an instance of a software image for an application or service. The first container is run such that the first container performs various operations. For example, access to one or more external elements that reside outside of the software image is initiated. Based on the one or more external elements, a configuration of the first container is changed from what is provided by the software image.

16 Claims, 10 Drawing Sheets

(56) References Cited

U.S. PATENT DOCUMENTS

| | | | |
|---|---|---|---|
| 10,261,782 B2 | 4/2019 | Suarez et al. | |
| 10,310,949 B1 | 6/2019 | Chakraborty et al. | |
| 10,356,214 B2 | 7/2019 | Joshi et al. | |
| 10,389,582 B1 | 8/2019 | Fakhouri et al. | |
| 2017/0147319 A1* | 5/2017 | Riek | H04L 67/06 |
| 2017/0154017 A1 | 6/2017 | Kristiansson et al. | |
| 2017/0177860 A1 | 6/2017 | Suarez et al. | |
| 2017/0185488 A1 | 6/2017 | Kumarasamy et al. | |
| 2017/0300311 A1 | 10/2017 | Lopez et al. | |
| 2017/0315795 A1 | 11/2017 | Keller | |
| 2018/0075086 A1 | 3/2018 | Yam et al. | |
| 2018/0088926 A1 | 3/2018 | Abrams | |
| 2018/0088935 A1 | 3/2018 | Church et al. | |
| 2018/0095778 A1 | 4/2018 | Aydelott et al. | |
| 2018/0095973 A1 | 4/2018 | Huang et al. | |
| 2018/0136931 A1 | 5/2018 | Hendrich et al. | |
| 2018/0157516 A1 | 6/2018 | Kristiansson et al. | |
| 2018/0173502 A1 | 6/2018 | Biskup et al. | |
| 2018/0205652 A1 | 7/2018 | Saxena | |
| 2018/0285199 A1 | 10/2018 | Mitkar et al. | |
| 2018/0285210 A1 | 10/2018 | Mitkar et al. | |
| 2018/0341471 A1 | 11/2018 | Stefanov et al. | |
| 2019/0034313 A1 | 1/2019 | Vedurumudi et al. | |
| 2019/0050680 A1 | 2/2019 | Waugh et al. | |
| 2019/0095254 A1* | 3/2019 | Rao | G06F 9/45558 |
| 2019/0132329 A1 | 5/2019 | Verberkt et al. | |
| 2019/0163559 A1 | 5/2019 | Takahashi et al. | |
| 2019/0208031 A1 | 7/2019 | Bennet et al. | |
| 2019/0230130 A1 | 7/2019 | Beckman et al. | |
| 2019/0235897 A1* | 8/2019 | Goel | G06F 9/545 |
| 2019/0260716 A1 | 8/2019 | Lerner | |
| 2019/0278669 A1 | 9/2019 | Mueller-Wicke et al. | |
| 2019/0303541 A1* | 10/2019 | Reddy | H04L 9/0643 |
| 2019/0354389 A1 | 11/2019 | Du et al. | |
| 2019/0392045 A1 | 12/2019 | De Lima Junior et al. | |
| 2020/0067763 A1* | 2/2020 | Vytla | H04L 49/25 |
| 2020/0356806 A1 | 11/2020 | Li et al. | |
| 2020/0394120 A1 | 12/2020 | Salmi et al. | |
| 2021/0042141 A1* | 2/2021 | De Marco | G06F 9/45558 |
| 2021/0048995 A1 | 2/2021 | Myers et al. | |
| 2021/0048998 A1 | 2/2021 | Myers et al. | |

OTHER PUBLICATIONS

Title: Container-based microservice architecture for cloud applications author: V Singh et al, published o 2017.*

Container and microservice driven design for cloud infrastructure devops; author: H. Kang published on 2016.*

Doc-archives.microstrategy.com [online], "Installing and Configuring MicroStrategy Library," Jun. 2017, retrieved on Oct. 25, 2019, retrieved from URL <https://doc-archives.microstrategy.com/producthelp/10.10/InstallConfig/WebHelp/Lang_1033/Content/install_config_library.htm>.

docs.docker.com [online], "Get Started, Part 1: Orientation and setup," 2017, retrieved on Oct. 25, 2019, retrieved from URL<https://docs.docker.com/get-started/>, 6 pages.

Dyn.com "Kubernetes: The Difference Between Containers and Virtual Machines," Feb. 2018, retrieved on Oct. 25, 2019, retrieved from URL <https://dyn.com/blog/kubernetes-the-difference-between-containers-and-virtual-machines/>, 8 pages.

Edureka.co [online], "Docker tutorial—Introduction to docker & containerization," 2017, retrieved on Oct. 25, 2019, retrieved from URL <https://www.edureka.co/blog/docker-tutorial>, 10 pages.

Kubernetes.io [online], "Concepts underlying the cloud controller manager," May 2019, retrieved on Jun. 20, 2019, retrieved from URL <https://kubernetes.io/docs/concepts/architecture/cloud-controller/>, 9 pages.

Kubernetes.io [online], "StatefulSet is the workload API object used to manage stateful applications," Jun. 2019, retrieved on Jun. 20, 2019, retrieved from URL <https://kubernetes.io/docs/concepts/workloads/controllers/statefulset/>, 9 pages.

Linkedin.com [online], "Moving MicroStrategy to a docker/kubernetes infrastructure," Jan. 2018, retrieved from Oct. 25, 2019 retrieved from URL <https://www.linkedin.com/pulse/moving-microstrategy-dockerkubernetes-infrastructure-montero/>, 3 pages.

linuxize.com [online], "How to Remove Docker Containers, Images, Volumes, and Networks," Oct. 2018, retrieved on Oct. 25, 2019, retrieved from URL <https://linuxize.com/post/how-to-remove-docker-images-containers-volumes-and-networks/#remove-one-or-more-containers>, 11 pages.

MicroStrategy.com [online], "Microstrategy on Kubernetes," 2017, retrieved on Oct. 25, 2019, retrieved from URL <https://www.microstrategy.com/getmedia/d99b44dc-ec44-451b-a5a3-3db7160282f0/Genesys-How-to-run-MicroStrategy-on-Kubernetes>, 10 pages.

Stackoverflow.com [online] "What's the difference between ClusterIP, NodePort and LoadBalancer service types in Kubernetes?" Jan. 2017, retrieved from URL <https://stackoverflow.com/questions/41509439/whats-the-difference-between-clusterip-nodeport-and-loadbalancer-service-types/52241241#52241241>, 6 pages.

Tuton, "Deploy A MongoDB replica set using the IBM Cloud Kubernetes Service," IBM Developer, Mar. 15, 2018, 14 pages.

Wikipedia.org [online], "Docker(software)," Mar. 2013, retrieved on Oct. 25, 2019, retrieved from URL <https://en.wikipedia.org/wiki/Docker_(software)>, 8 pages.

Wikipedia.org [online], "OS-level virtualization," Aug. 2006, retrieved on Oct. 25, 2019, retrieved from URL <https://en.wikipedia.org/wiki/OS-level_virtualization> , 4 pages.

Wikipedia.org [online], "System Image," Feb. 2013, retrieved Oct. 25, 2019, retrieved from URL <https://en.wikipedia.org/wiki/System_image>, 2 pages.

Wong, "What's the Difference Between Containers and Virtual Machines?," Electronic Design, retrieved from URL <http://electronicdesign.com/dev-tools/what-s-difference-between-containers-and-virtualmachines>, 3 pages.

www2.microstrategy.com [online], "MicroStrategy Intelligence Server," Apr. 2019, retrieved on Oct. 25, 2019, retrieved from URL <https://www2.microstrategy.com/producthelp/10.4/ProjectDesignGuide/WebHelp/Lang_1033/Content/ProjectDesign/MicroStrategy_Intelligence_Server.htm>.

www.en.wikipedia.org [online], "Online Analytical Processing" Mar. 2018, retrieved on Mar. 19, 2020, retrieved from URL, <https://en.wikipedia.org/wiki/Online_analytical_processing>. 14 pages.

Xu et al.; "Mining Container Image Repositories for Software Configuration and Beyond": 2018 ACM/IEEE 40th International Conference on Software Engineering: New Ideas and Emerging Results—ICSE-NIER'18, May 27-Jun. 3, 2018, 6 pages.

Tao et al. "Dynamic Resource Allocation Algorithm for Container-based Service Computing"; 2017 IEEE 13th International Symposium on Autonomous Decentralized Systems-2017 IEEE, 62-7.

U.S. Office Action in U.S. Appl. No. 16/542,023, dated Mar. 12, 2021, 15 pages.

* cited by examiner

INTEGRATION OF CONTAINERS WITH EXTERNAL ELEMENTS

TECHNICAL FIELD

The present specification relates to container-based computer environments.

BACKGROUND

Traditionally, containers are stateless. For example, a container may be a running instance of a software image, and the state of the container may be lost when the container is terminated and removed from an environment. In many cases, making a change that will be present when the software image is reloaded as a new container requires a change to the software image. Thus, changes to settings, dependencies, drivers, and other aspects of a container are often made through updates to the software image that is loaded, which can be a complex and time-consuming task.

SUMMARY

In some implementations, a container-based computer system includes features to integrate containers with third-party drivers, customizations, and other elements that are stored outside the software images that run as containers. For example, a server system may provide a server environment using various containers, e.g., different instances of software images that run separately (e.g., in isolation from each other) on a host operating system. The server system can provide for communication and integration across container boundaries. The server system also enable persistence of data and container state for individual containers and for the server environment as a whole when containers are added and removed, even when the container images and container-based platform do not natively provide persistence. For example, the server system can track and store state information for the containers, and include one or more mechanisms for restoring or transferring the state information from one container to another. This can enable the persistence of container state, so the state can be transferred from a container that is stopped and removed to a new container that is later created and started. In addition, the server system can include features that enable containers to rely on external settings, drivers, and other elements that reside outside the software image. Unlike typical containers, the software images can be designed so that containers request, obtain, and use configuration data, customizations to a software image, drivers, elements needed as dependencies, and other items that reside outside the containers.

Usually, software images for containers are designed to be complete and self-contained, so they do not rely on external code or files needed for the container to run. Software images designed to run as containers include all of the resources that may be needed to carry out the functions of the containers. For example, a software image for an application or service would normally include all of the files, libraries, configuration settings, policies, and other elements that are relied on by the application or service. If a container relies on a driver, for example, the driver is included in the software image for the container. With this approach, all of the dependencies and other needs of a container-based application can be guaranteed to be satisfied, since they are contained within the atomic software image for the application.

However, the approach of entirely self-contained software images generally requires changes to the software image in order to make changes that will apply to multiple instances of the software image and to containers that loaded from the software image at different times. Changing the software image can require significant effort and validation, typically by skilled engineers. Further, once a software image is updated, existing containers based on the original software image need to be stopped and removed, often causing a disruption in service, for the new software image to be loaded as a new container. For these and other factors, successively updating software images for containers can be impractical for making small, frequent changes. There are other limitations as well. To make a change for multiple software images, each software image must be updated. Also, technical limitations or licensing restrictions may block certain elements from being included in a software image.

By contrast with traditional systems, the systems discussed herein can enable state data, updates, and customizations to be applied to containers without requiring updates to the software images for the containers. In some implementations, software images are configured to look outside of the container to obtain configuration information and/or various external resources. The software images can be designed so that, when run as a container, the container acquires and incorporates configuration information that is different from or not included in configuration information specified in the software image. The configuration information may be used to update or modify the instance of the software image running as the container. The container may also obtain resources that are outside the container, e.g., resources not present in the software image that is loaded as the container. The external resources information may be used to update or modify the container (e.g., may be brought into the container to execute there), or in some implementations may run outside the container. Accordingly, the container can be updated or modified relative to its software image without requiring a change to the underlying software image in a repository and without redeploying a new instance of the software image.

Various different techniques can be used to achieve integration of containers with external elements, as discussed further below. In some implementations, the system pushes new, updated, or otherwise modified configuration information and/or external resources into the container, resulting in the container (e.g., the instance of the software image running as the container) being modified. In some implementations, new, updated, or otherwise modified configuration information may direct a container to one or more resources different from resources included in or previously used by the container. For example, the software image for a container may include a reference to a source of configuration information, with instructions to obtain and process the configuration information from the source. The container can be configured to seek out the configuration information and act on it, so that the operation of the container initiates the incorporation of external elements (e.g., to pull the external elements into the container or to reconfigure software of the container), rather than be directed to make the changes by the host system or a management process. In some implementations, new, updated, or otherwise modified configuration information may direct a container to updated or modified versions of resources previously used by the container.

In one general aspect, a method includes: providing, by a server system, a server environment using one or more containers, the one or more containers including a first container that is an instance of a software image for an application or service; running the first container such that the first container performs operations including: initiating access to one or more external elements that reside outside the software image; and changing, based on the one or more external elements, a configuration of the first container from what is provided by the software image.

Implementations may include one or more of the following features. For example, in some implementations, changing the configuration of the first container includes retrieving an element into the first container that is not included in the software image and incorporating the retrieved element into the first container, where the incorporated element includes a library, an executable, a driver, or code.

In some implementations, the software image includes a first software module and is configured to use the first software module, and changing the configuration of the first container includes the first container configuring itself to obtain and use a second software module instead of the first software module that is included in the software image.

In some implementations, the second software module is an upgraded version of the first software module.

In some implementations, the software image includes a reference to a source of data outside the first container, where the access to the one or more external elements is initiated based on the reference in the software image.

In some implementations, the source of data is a configuration file corresponding to the first container or the software image.

In some implementations, the configuration file points to a location external to the software image for retrieval of a software module, and changing the configuration of the first container includes: reading contents of the configuration file based on a reference in the software image to the configuration file located outside the software image; and based on the contents of the configuration file, retrieving the software module from the location external to the software image. In these implementations, changing the configuration of the first container includes incorporating the retrieved software module into the first container.

In some implementations, the operations include determining, by the first container, one or more settings from the configuration file; changing the configuration of the first container includes applying to the first container the one or more settings determined from the configuration file.

In some implementations, the operations include, while the first container is running: detecting, by the first container, a change to the configuration file or receiving, by the first container, a notification that the configuration file has changed; in response to detecting the change or receiving the notification, initiating, by the first container, access to the first container and changing the configuration of the first container based on the changed contents of the configuration file.

In some implementations, the first container is configured to access the configuration file each time a condition is satisfied in order to determine whether further changes to the first container are needed according to the current contents of the configuration file.

In some implementations, the condition includes invocation of a particular function performed by the first container.

In some implementations, the server system associates a stateful set of data with the first container, and the method includes the server system storing a copy of the stateful set of data in persistent storage such that the stored stateful set of data enables the server system to replicate, for another container running an instance of the software image, a current state of the first container.

In some implementations, the one or more external elements are located in the stateful set of data.

In some implementations, the one or more external elements are located outside the stateful set of data and are accessed over a computer network.

In some implementations, initiating access to one or more external elements and changing the configuration of the first container are performed upon starting the first container.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
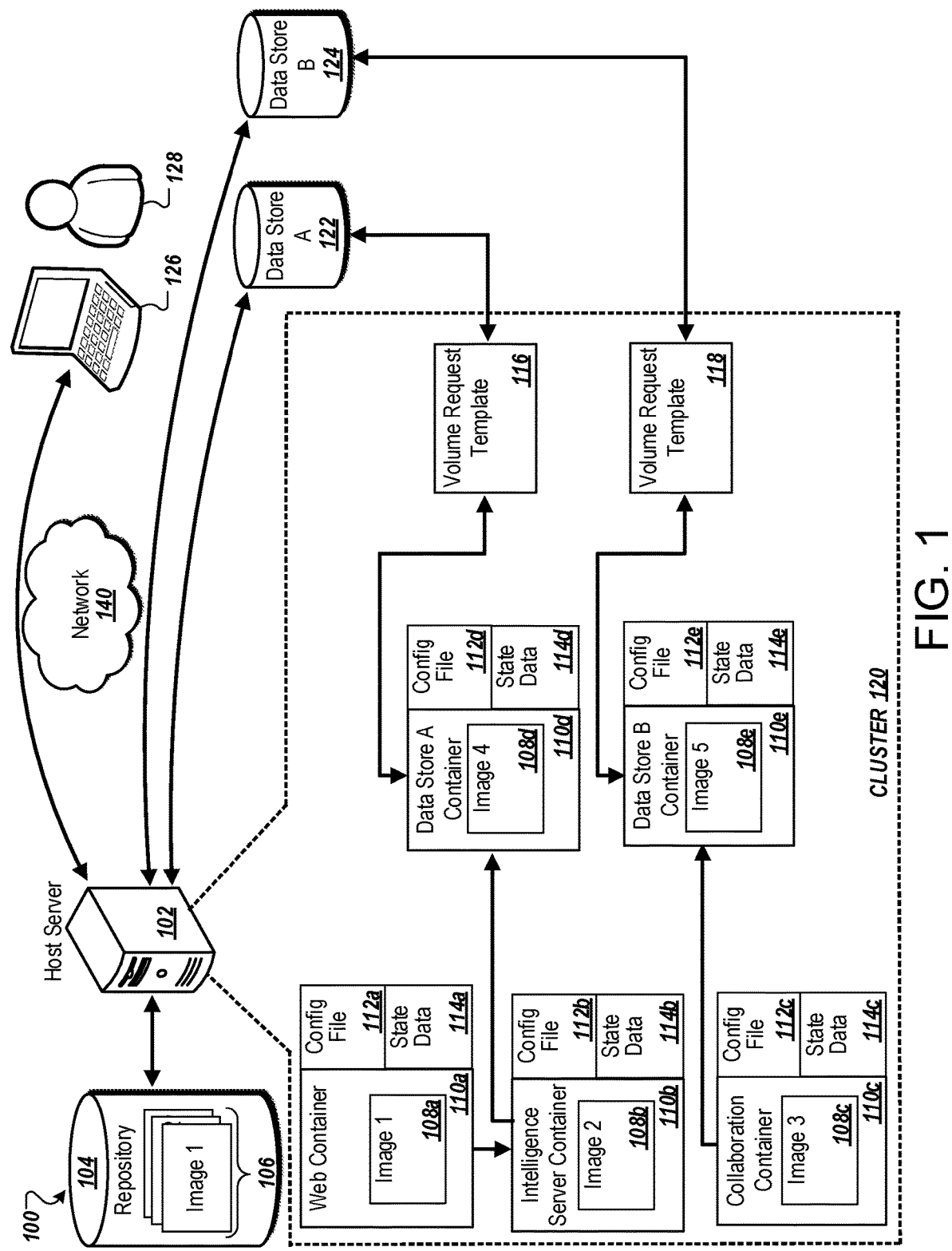
FIG. 1 is a diagram showing an example of a system using a container-based server environment.

In some implementations, a computing system provides a server environment by running multiple software modules as containers that communicate with each other to respond to provide services to clients. For example, software modules for different functions, applications, and/or services within the server environment may be executed as different containers, which can operate separately and independently of each other. One or more of the containers may provide front-end interfaces for client devices to interact with the server environment. One or more of the containers may provide back-end functions such as query processing, natural language processing, access control, authentication, database processing, and so on. The containers in the cluster may be able to communicate with certain other containers within the cluster to fulfill user requests. For example, the arrangement may limit which containers may communicate with each other, as well as the nature of the communications, for example, using application programming interfaces (APIs) to specify the types of interactions permitted.

A container-based server environment can provide various advantages in managing and upgrading the server environment. For example, containers can be dynamically started and stopped to balance load and manage resource usage. If one container experiences a high volume of traffic, another container for the same function can be started to help share the traffic. As another example, the use of containers can improve reliability. If one of the containers is terminated, crashes, or otherwise ends, other containers continue running and are unaffected. The system can create a new container with an instance of the same software as the container that was terminated. The system can track and store state data about containers, so that the operating state of a container can be recreated later. As another example, the use of containers can facilitate upgrades to portions of the server system with little or no downtime. While the server environment runs a first container with one version of a software module, the system can start running a second container with an upgraded version of the software module. With the first container and second container running in parallel, the system can A container-based server environment can be configured to carry out various analytics functions. For example, a container-based environment can be used to implement a business intelligence system that performs manages databases and data sets, performs data analysis, generates visualizations of data, and generates reports and other documents. Other business intelligence functions include online analytical processing, analytics, data mining, process mining, complex event processing, business performance management, benchmarking, text mining, predictive analytics, and prescriptive analytics.

In some implementations, a server environment is configured to operate using a plurality of software modules loaded into separate containers. The software modules may provide, for example different software services or applications, which may interact with each other and/or communicate with external systems. For example, a server environment providing an analytics system can provide containers that have separate modules for functions typically performed by web servers, database servers, search engines, authentication servers, file servers or other network storage, and other server functions.

The software modules can be loaded from stateless images from a repository, allowing individual modules to be loaded and unloaded dynamically. State information for a given software module can be stored in associated data storage, such as one or more configuration files, scripts, and state data sets.

A container-based server environment can enable software modules loaded from stateless images to interoperate with third-party drivers and other customizations located outside the software image and outside the container. In general, it may be necessary or desirable for some elements of a server platform to reside outside module containers, even though the module running in the containers may rely on the external elements. For example, it may be desirable to dynamically load a software module with different combinations of external elements (e.g., drivers and other supporting elements) without requiring management of different software images for each combination. Similarly, technical reasons, licensing requirements, or security requirement may block the inclusion of some elements from being included in a module image, even if it is desirable to use the elements in some circumstances.

The ability for individual modules in containers to interoperate with external software associated with but outside the respective containers can improve the ability to customize a server environment and dynamically alter and upgrade the environment. This can be a significant advantage when upgrading or altering the components outside the software module. Indeed, elements of a module that are frequently updated may be specifically excluded from the module and held in outside storage to facilitate updates without changes to the main module image. This can enable external components such as drivers to be upgraded independently of the software module image, and with low or minimal downtime to make the change. The technique can also allow external components that are common to multiple different software modules to be conveniently updated together, allowing changes to be made across multiple modules without changing the module images.

In some implementations, a software image designed to run in a container may be configured to access an external file, such as a script or configuration data file, upon loading of the module. For example, the software image may be designed to integrate, invoke, or otherwise access a certain file when the image first executes.

FIG. 1 is a diagram showing an example of a system 100 using a container-based server environment. The system 100 includes a host server 102 which runs various containers 110a-110e which each provide a portion of the functionality of a server environment. The containers 110a-110e represent different instances of software images 106 that are available from a repository 104, which may be local or remote with respect to the host server 102. The host server 102 may be local, e.g. on-premises, or may be part of a cloud computing service. The host server 102 can provide a cluster 120 of processing nodes that execute the respective containers 110a-110e. As discussed further below, the containers 110a-110e represent instances of applications and/or services that together represent a server environment. For example, the server environment can provide analytics services (e.g., querying, reporting, database access, OLAP, etc.) to various client devices.

In order to manage the containers 110a-110e, the system 100 may leverage one or more container engines or technologies such as, for example, Docker and/or CoreOS rkt. In order to arrange the containers to perform a variety of different server functions, the system 100 may leverage one or more container orchestration engines (COEs) such as, for example, Kubernetes, Mesos, and/or Docker Swarm. These technologies can automate various functions such as creating new containers, initializing or restoring state of the containers, starting execution of containers, monitoring containers, stopping execution of containers, and removing stopped containers from the server environment.

The system 100 includes the host server 102, the repository 104, and an administrator device 126 accessible by an administrator 126. In the illustrated example, the system 100 includes a first data store 122 ("Data Store A") and a second data store 124 ("Data Store B"). The administrator device 126 may communicate with the host server 102 over, for example, the network 140. The host server 102 may communicate with the first data store 122 and the second data store 124 over, for example, the network 140. The host server 102 may communicate with the repository 104 over, for example, the network 140.

The administrator device 126 can be an electronic device such as a computing device. The administrator device 126 can be, for example, a desktop computer, a laptop computer, a smart phone, a cell phone, a tablet, a PDA, etc. The administrator device 126 may be a client device. The administrator device 126 is accessible by a administrator 128, e.g., a software developer, an operator, etc.

The host server 102 is a server system and can include one or more computing devices. In some implementations, the host server 102 is located on the premises of a customer, e.g., on-premises. In other implementations, the host server 102 is not located on the premise of a customer, e.g. off-premise. In these implementations, the host server 102 may be part of a cloud provider, e.g., a third-party server system, such as, for example, Amazon Web Services (AWS), Microsoft Azure, or Google Cloud Platform (GCP). In some implementations, the host server 102 and the administrator device 126 are part of single computer system.

The repository 104 is a data storage containing a collection of software images 106. The collection of software images 106 being a collection of software images. The collection of software images 106 may include various images for differing applications and functions, and/or various images of different versions of the same application or function. In some implementations, the repository 104 is located on the premises of a customer, e.g., on-premises. In other implementations, the repository 104 is not located on the premise of a customer, e.g. off-premise. In these implementations, the repository 104 may be part of a cloud provider, e.g., a third-party server system, such as, for example, Docker Hub, Amazon Web Services (AWS), Microsoft Azure, or Google Cloud Platform (GCP).

The network 140 can include public and/or private networks and can include the Internet.

In general, a software image, such as those included in the collection of software images 106, may refer to a snapshot, or template, from which new containers can be started. The software image can be a serialized copy of the entire state of an application or service stored in a non-volatile form, such as one or more files. Software images for containers of container-based environments generally exclude the operating system, but include the application or service, as well as supporting code libraries, dependencies, data sets, and so on that allow the application or service to run on an operating system of a host. The elements of the software image can be configured in a particular state. This package, the software image, is then executable as a container on the operating system of a host system, e.g., a cluster of processing nodes.

In serving as a snapshot or template, a single software image can be used to deploy multiple containers, with each container running a different instance of the same software image. A software image may include all of the components necessary for running a container, e.g., running an independent instance of the application or service for which the software is stored in the software image. These various components may include, for example, dependencies such as libraries and/or tools, code, a configuration file, one or more drivers, and/or settings. The software image may also contain references, pointers, or links to objects such as files outside of the software image and/or the corresponding container. Software images often define an internal file system structure, e.g., with various files organized in folders or directories, so that components of the software image can reference and access each other in a predictable manner. A software image may be composed of a set of read-only layers. A software image may be modified, for example, by adding a new layer to the set of read-only layers. A software image may be associated with a particular application or function. Similarly, the components of a software image may be associated with a particular application or function.

In general, a container may refer to an encapsulated environment in which applications or functions, e.g., services, are run. A container is defined by a software image and by a configuration file. A container is an instance of a software image and has access to the components of the software image. Using containers, the system 100 can run multiple instances of the same software image within different containers.

In general, a cluster represents a set of processing nodes. The processing nodes may each represent physical hardware, such as processors, processor cores, or computers. The processing nodes may additionally or alternatively represent virtualized processing nodes, such as virtual CPUs that represent processing capabilities of a hardware platform but may not be mapped directly to specific hardware processors. Individual containers or groups of containers may be assigned to be run using specific processing nodes or groups of processing nodes. In some implementations, each container is assigned to and run by a different processing node in the cluster. In some implementations, multiple containers are grouped together to be executed by one or more processing nodes of the cluster. For example, a grouping such as a Kubernetes pod may include multiple containers that execute using the same processing node(s).

The techniques disclosed in this document can be used to more conveniently provide server functions. For example, a container-based or "containerized" server environment as shown in FIG. 1 can variety of different server functions without requiring separate servers such as a database server, a document library server, a web server, and a collaboration server. This can greatly streamline the management and maintenance of the server environment, while still providing the same or even more functionality than implementations with stand-alone servers. A container-based server environment also enables centralized management that simplifies the launch and updating of applications and functions.

The techniques disclosed in this document can be used to more efficiently provide server functions. Containers generally utilize fewer resources and less disk space than virtual machines. As a result, compared to stand-alone servers and virtualized servers, a container-based server environment can often provide equivalent performance with fewer hardware resources, or provide greater throughput and capacity using the same level of hardware resources.

Although virtual machines and containers both run on host machines, there are significant differences between them. Typically, a virtual machine is an instance of a distinct computer system including an operating system and any number of installed applications. The virtual machine uses emulation software that runs on a host system, usually a real hardware system although it can also be a virtual one. This is made possible either full virtualization or hardware-assisted virtualization, both providing the emulation layer required to run a guest operating system in full isolation. A typical virtual provides complete isolation in terms of having its own processes, networking, users, etc., which are separate from the host system and other guest systems that may be running alongside it.

Containers are typically instances of software that run on a host machine. Like virtual machines, containers can allow isolated processes, networking, users, etc. However, with containers, a guest operating system is not installed, and the container often includes only the application code needed for a single application. As a result, running the container runs the processes necessary for a particular application or service, without creating the overhead of a guest operating system. Containers can take advantage of the host operating system and layered file system, instead of requiring the emulation layer used to run virtual machines. Because a container doesn't require its own operating system, it uses fewer resources and consumes only the resources required for the application that is run upon starting the container.

In further detail, a virtualized system includes a host operating system and a hypervisor that runs on the host operating system. The hypervisor manages the various virtual machines, providing isolation between the virtual machines and the host operating system. The hypervisor can also provide emulation so each virtual machine can run as if it had direct access to the server hardware. Each virtual machine then includes a guest operating system, its own copy of any libraries or binaries needed, as well as applications run in the virtual machine. Each instance of a virtual machine thus runs its own operating system and its own applications and copies of supporting libraries.

By contrast with the virtualization approach, the container-based approach does not involve a hypervisor or emulation layer. The containers can run on the host operating system and the containers do not include guest operating systems. In some implementations, multiple containers (which may be multiple instances of the same software image) may share certain libraries, binaries, or other resources, which can further improve efficiency.

As shown in FIG. 1, a container-based server environment includes containers 110a-110e running on the cluster 120 of processing nodes provided by the host server 102. Each container 110a-110e has an associated configuration file and state data. Each container runs an instance of a software image, which may be referred to as a container image. The software image includes the executable code for an application or service, as well as dependencies for the application or service. However, the software image for a container does not include an operating system. One or more of the software images 108a-108e within the containers 110a-110e respectively may have been stored in and obtained from the repository 104.

The containers may include containers developed or provided by different parties. For example, containers 110a-110c may be provided by one organization, and containers 110d and 110e may be provided by a different organization. As will be described in more detail with respect to FIG. 2, the variety of containers may include containers for applications and/or functions related to business intelligence (BI). These BI containers may include, for example, a web interface container 110a, an intelligence server container 110b, and a collaboration container 110c. The third-party containers include a data store A container 110d and a data store B container 110e.

The third-party containers 110d and 110e may run third-party applications or functions. These applications or functions may include, for example, applications or functioned related to database management, document databases, distributed streaming platforms, key-value stores or data structure stores, etc. These third-party containers may have one or more corresponding data stores or databases. Here, the container 110d corresponds with a first data store 122 ("Data Store A"), and the container 110e corresponds with a second data store 124 ("Data Store B"). The container 110d is able to communicate with the first data store 122 through a first volume request template 116 in order to, for example, retrieve data from the data store 122 or to push data to the data store 122. The container 110e is able to communicate with the second data store 124 through a second volume request template 118 in order to, for example, pull data from the data store 124 or to push data to the data store 124. The volume request templates 116 and 118 may allow for volume requests to automatically be generated. The volume request templates 116 and 118 may provide templates for volume plugin requests. The volume request template 116 and/or the volume request template 118 may be a volume plugin template. The volume request template 116 and/or the volume request template 118 may be a persistent claim volume template.

Each of the containers 110a-110e may have a corresponding configuration file 112a-112e. When each container 110a-110e is created and initialized, the host server 102 accesses the appropriate configuration file 112a-112e to prepare the container. For example, a configuration file 112a-112e may be a script that the host server 102 runs to modify or configure a software image when the software image is first loaded as a new container. The configuration file may cause the software image to be altered or updated, and/or may specify parameters to be used in operating a container using the software image (e.g., hardware resources needed, network port assignments, etc.). Processing the configuration file for a software image may insert data such as values for settings into the container that is an instance of the software image. The configuration files 112a-112e may be stored in the repository 104 with the software images 106.

The configuration files 112a-112e may include various parameters, such as cache sizes, capacity limits, port assignments, etc. Accordingly, the configuration files 112a-112e may facilitate the deployment of the containers 110a-110e. The administrator 128 can be provided access to create or modify the configuration files 112a-112e through the administrator device 126. In some implementations, configuration files 112a-112e are embedded in a software image.

The software images 108a-108e represent software images that an administrator selected from the collection of software images 106 in the repository 104 to be run as containers on the cluster 120.

Figure 4:
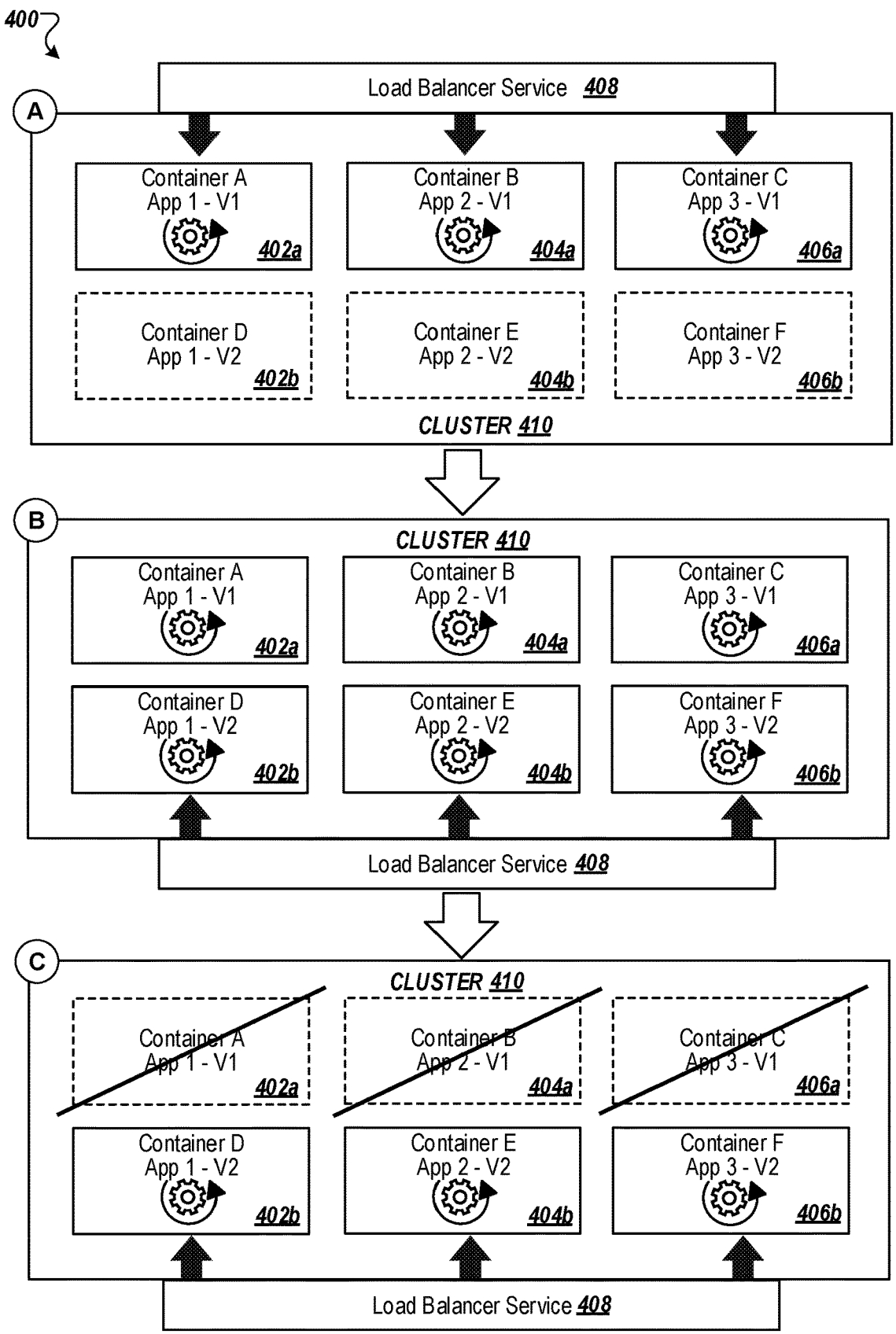
FIG. 4 is a diagram illustrating an example process for updating software in a container-based server environment.

The administrator 128, through the administrator device 126, may modify the software images 108a-108e from time to time, for example, to upgrade the applications and services provided by the software images 108a-108e. FIG. 4 shows an example how updated images can be loaded and used in a server environment without disrupting open sessions and operations in progress.

Each of containers 110a-110e has a corresponding set of state data 114a-114e. The state data 114a-114e represents the current state of each container 110a-110e, may include, for example, session-based state data. In some implementations, the state data 114a-114e includes data in addition to session-based state data such as, for example, environment-based state data. If one or more of the containers 110a-110e were to crash or otherwise end, they could effectively be redeployed and brought back to their previous state by the system 100 leveraging the respective state data 114a-114e. For example, if the web interface container 110a were to crash, the session-based state data from the previous session would be stored in the state data 114a. In this example, upon the redeployment of a web interface container having the first image 108a and having the configuration file 112a mounted to it, the state data 114a could be read into the redeployed container in order to return the redeployed container to the previous state of the web interface container 110a.

As shown, the server environment includes the web interface container 110a, the intelligence server container 110b, the collaboration container 110c, the data to the data store A container 110d, the data store B container 110e, the configuration files 112a-112e, the state data 114a-114e, and the volume request templates 116 and 118. The server environment may include other components that are not shown, such as additional containers, configuration files containing deployment instructions for the server environment, etc.

The web interface container 110a includes a first image 108a. The web interface container 110a corresponds with the configuration file 112a and the state data 114a. During the deployment of the server environment, data from the web interface container 110a may be added to the state data 114a. The web interface container 110a may be able to send data to the intelligence server container 110b.

The intelligence server container 110b corresponds with the configuration file 112b and the state data 114b. During the deployment of the server environment, data from the intelligence server container 110b may be added to the state data 114b. The intelligence server container 110b may be able to send data to the data store A container 110d.

The collaboration container 110c corresponds with the configuration file 112c and the state data 114c. During the deployment of the server environment, data from the collaboration container 110c may be added to the state data 114c. The collaboration container 110c may be able to send data to the data store B container 110e.

The data store A container 110d corresponds with the configuration file 112d and the state data 114d. During the deployment of the server environment, data from the data to the data store A container 110d may be added to the state data 114d. The data store A container 110d may be able to send data and receive data from the data store 122 by using the volume request template 116.

The data store B container 110e corresponds with the configuration file 112e and the state data 114e. During the deployment of the server environment, data from the data to the data store B container 110e may be added to the state data 114e. The data store B container 110e may be able to send data and receive data from the data store 124 by using the volume request template 118.

Figure 2:
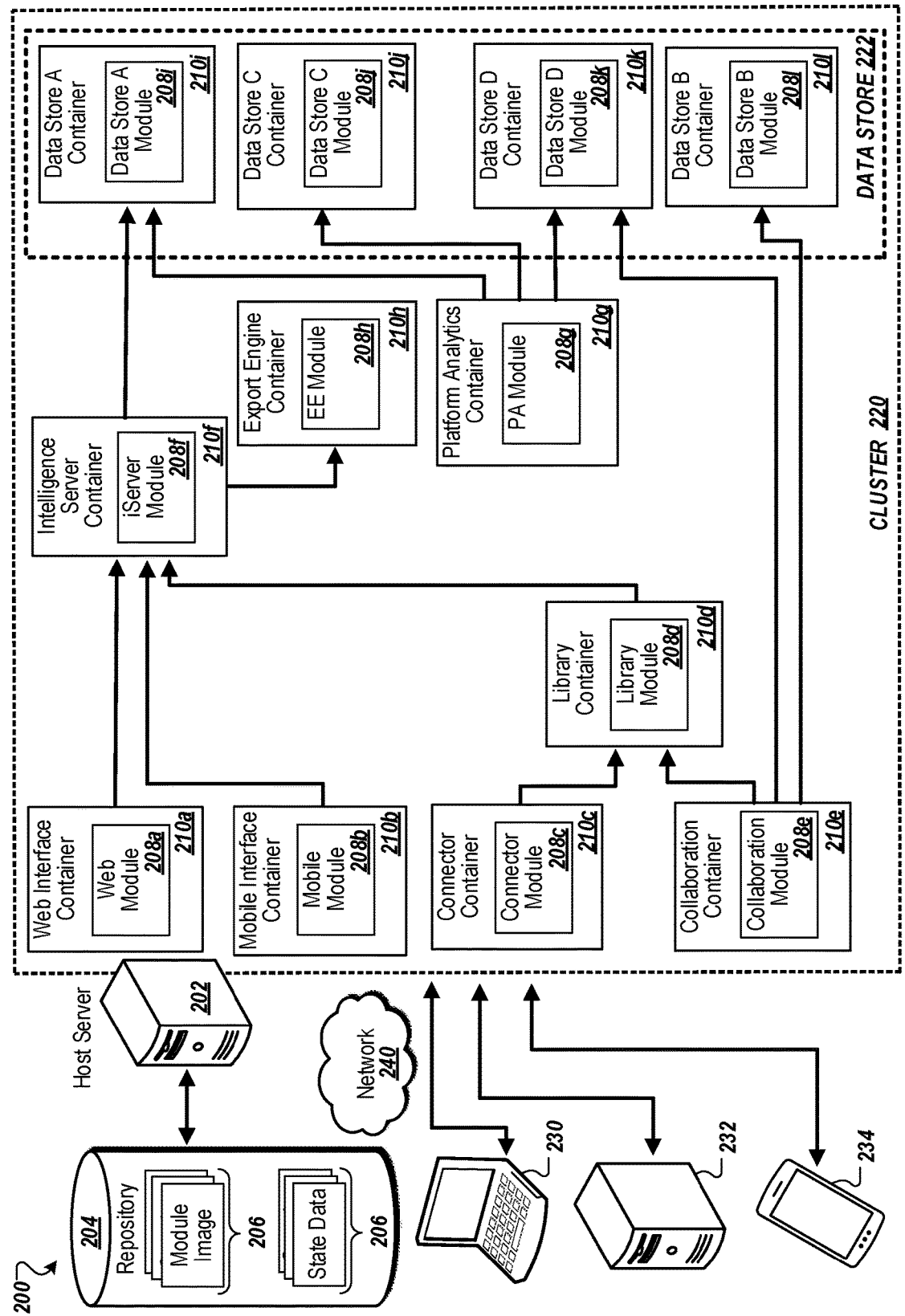
FIG. 2 is another diagram showing an example of a system using a container-based server environment.

FIG. 2 is a diagram showing an example of a system 200 using a container-based server environment. Through the system 200, various containers represent instances of software images running on a host server 202. The host server 202 may access the software images stored on a local or remote repository 204. The host server 202 may be local, e.g. on-premises, or may be part of a cloud computing service. The containers may be used to perform a variety of different server functions.

In order to generate and deploy the containers, the system 200 may leverage one or more container engines or technologies such as, for example, Docker and/or CoreOS rkt. In order to arrange the containers to perform a variety of different server functions, the system 200 may leverage one or more container orchestration engines (COEs) such as, for example, Kubernetes, Mesos, and/or Docker Swarm.

In some implementations, the system 200 is the system 100 as shown in FIG. 1.

The system 200 includes the host server 202 and the repository 204. The system 200 may further include or communicate with a client device 230, a client device 232, and a mobile client device 234. The client devices 230-34 may communicate with the host server 202 over, for example, the network 240.

The client devices 230, 231, 232 can each represent an electronic device such as a laptop computer, a desktop computer, a mobile phone, a smart phone, a tablet, a personal digital assistant, or another computing device.

The host server 202 is a server system and can include one or more computing devices. In some implementations, the host server 202 is located on the premises of a customer, e.g., on-premises. In other implementations, the host server 202 is not located on the premise of a customer, e.g., off-premises. In these implementations, the host server 202 may be part of a cloud provider, e.g., a third-party server system, such as, for example, Amazon Web Services (AWS), Microsoft Azure, or Google Cloud Platform (GCP). In some implementations, the host server 202 is the host server 102 described above with respect to FIG. 1.

The repository 204 is a data storage containing a collection of software images 206. The collection of images 206 may include various images for differing applications and functions, and/or various images of different versions of the same application or function. In some implementations, the repository 204 is located on the premises of a customer, e.g. on-premises. In other implementations, the repository 204 is not located on the premise of a customer, e.g. off-premise. In these implementations, the repository 204 may be part of a cloud provider, e.g., a third-party server system, such as, for example, Docker Hub, Amazon Web Services (AWS), Microsoft Azure, or Google Cloud Platform (GCP). In some implementations, the repository 204 is the repository 104 described above with respect to FIG. 1. In these implementations, the collection of images 206 may be the collection of software images 106 described above with respect to FIG. 1.

The network 240 can include public and/or private networks and can include the Internet.

The server environment may include a variety of containers for various server related applications and/or functions. The server environment may include one or more containers for performing processing for analytics, such as business intelligence analytics. For example, as shown the server environment includes the containers 201a-210l where the containers 210a-210g may relate to server analytics. The server environment may include third-party containers. These third-party containers may include containers that are configured to send data to, receive data from, and/or communicate with external data stores and/or databases. Similarly, the third-party containers may be instances of software images developed and/or provided by third parties. These containers 210i-210l can be third-party containers.

The server environment may include various components not shown. For example, the server environment may include various configuration files for the containers 210a-210l, various state data for each of the containers 210a-210l, volume request templates for the data store 222 containers 210i-210l to allow the containers 210i-210l to communicate with external data stores or databases, a configuration file for the server environment, other containers, etc.

The client devices 230-234 may be able to interact with the server environment through front-end interface services or functions of the server environment. As will be described in more detail below, these front-end interface services or functions may include, for example, the web interface container 210a, the mobile interface container 210b, and the library container 210d. Other containers in the server environment may be back-end containers. These back-end containers may include, for example, the intelligence server container 210f, the export engine container 210h, and the data store containers 210i-210l.

The web interface container 210a includes a web module image 208a. The web module image 208a may be stored in and obtained from the collection of images 206 of the repository 204. The web interface container 210a may provide a front-end interface that can interact with the client devices 230-232. Users of one or more of the client devices 230-232 may be able to use the web interface container 210a for analytics and/or BI. For example, users of one or more of the client devices 230-232 may be able to use the web interface container 210a for BI reporting, analysis, and/or monitoring. For example, the web interface container 210a may provide users of the client devices 230-232 a single, unified web interface in which to perform the major styles of BI such as, for example, scorecards and dashboards, enterprise reporting, online analytical processing (OLAP) analysis, predictive analysis, and alerts and proactive notification. The web interface container 210a may allow users to move seamlessly between the various styles of BI and to combine multiple styles in a single report display.

The web interface container 210a can provide data to the intelligence server container 210f.

In some implementations, the web interface container 210a is the web interface container 110a as shown in FIG. 1.

The mobile interface container 210b includes a mobile module image 208b. The mobile module image 208b may be stored in and obtained from the collection of images 206 of the repository 204. The mobile interface container 210b may provide a front-end interface that can interact with the mobile client device 234. Users of the mobile client device 234 may be able to use the mobile interface container 210b for analytics and/or BI. For example, users of one or more of the mobile client device 234 may be able to use the mobile interface container 210b for BI reporting and analysis. The mobile interface container 210b may recognize touch and smart gestures placed by users through the mobile client device 234.

The mobile interface container 210b can provide data to the intelligence server container 210f.

The connector container 210c includes a connector module image 208c. The connector module image 208c may be stored in and obtained from the collection of images 206 of the repository 204. The connector container 210c may allow for the importation of data into the server environment from various data sources. For example, users of the client devices 230-232 may be able to use the connector container 210c to import data into the server environment from various data sources.

The connector container 210c can provide data to the library container 210d.

The library container 210d includes a library module image 208d. The library module image 208d may be stored in and obtained from the collection of images 206 of the repository 204. The library container 210d may provide a front-end interface that can interact with the client devices 230-234. Users of one or more of the client devices 230-234 may be able to use the library container 210d for analytics and/or BI. For example, users of one or more of the client devices 230-234 may be able to use the library container 210d for BI reporting and analysis. As an example, the library container 210d may provide users of the client devices 230-234 an interface to view, analyze, and consume various reports and documents.

The library container 210d can provide data to the intelligence server container 210f.

The collaboration container 210e includes a collaboration module image 208e. The collaboration module image 208e may be stored in and obtained from the collection of images 206 of the repository 204. The collaboration container 210e may allow users of the client devices 230-234 to access shared content, to search through documents or reports, to share content, to interact with other users, to monitor other users, to monitor other users' actions, etc.

The collaboration container 210e can provide data to the library container 210d, to the data store D container 210k in the, and to the data store B container 210l.

The intelligence server container 210f includes an intelligence server ("iServer") module image 208f. The intelligence server module image 208f may be stored in and obtained from the collection of images 206 of the repository 204. The intelligence server container 210f may provide an analytics and/or BI platform. The intelligence server container 210f may provide an analytics and/or BI platform that can be used by other applications or functions such as the applications and/or functions deployed in one or more of the other containers 210a-210e, and 210g-210l. For example, the intelligence server container 210f may provide an integrated platform for BI monitoring, reporting, and analysis.

The intelligence server container 210f can provide data to the export engine container 210h, and to the data store A container 210i.

In some implementations, the intelligence server container 210f is the intelligence server container 110b as shown in FIG. 1.

The platform analytics container 210g includes a platform analytics ("PA") module image 208g. The platform analytics module image 208g may be stored in and obtained from the collection of images 206 of the repository 204. The platform analytics container 210g may provide monitoring capabilities. For example, the platform analytics container 210g may provide a monitoring tool to collect platform data, e.g. telemetry. The platform analytics container 210g may allow for the collection of data from various server environments, users, e.g. users of the client devices 230-234, data cubes, etc.

The platform analytics container 210g can provide data to the data store A container 210i, the data store C container 210j, and the data store D container 210k.

The export engine container 210h includes a new export engine ("NEE") module image 208h. The export engine module image 208h may be stored in and obtained from the collection of images 206 of the repository 204. The export engine container 210h may provide a conversion function. This conversion function may be used, for example, by the intelligence server container 210f. For example, the intelligence server container 210f may use the export engine container 210h to convert various documents, reports, and dashboards into particular file types or formats. As an example, the intelligence server container 210f may use the export engine container 210h to create PDF files from various documents, reports, and dashboards.

The data store A container 210i includes a data store A module image 208i. The data store A module image 208i may be stored in and obtained from the collection of images 206 of the repository 204. The data store A container 210i may provide an application or function associated with an external data store or database. For example, the data store A container 210i may provide an application or function associated with the data store 122 shown in FIG. 1.

In some implementations, the data store A container 210i is the data store A container 110d as shown in FIG. 1.

The data store C container 210j includes a data store C module image 208j. The data store C module image 208j may be stored in and obtained from the collection of images 206 of the repository 204. The data store C container 210j may provide an application or function associated with an external data store or database.

The data store D container 210k includes a data store D module image 208k. The data store D module image 208k may be stored in and obtained from the collection of images 206 of the repository 204. The data store D container 210k may provide an application or function associated with an external data store or database.

The data store B container 210l includes a data store B module image 208l. The data store B module image 208l may be stored in and obtained from the collection of images 206 of the repository 204. The data store B container 210l may provide an application or function associated with an external data store or database. For example, the data store B container 210l may provide an application or function associated with the data store 124 shown in FIG. 1.

In some implementations, the data store B container 210l is the data store B container 110e as shown in FIG. 1.

Figure 3:
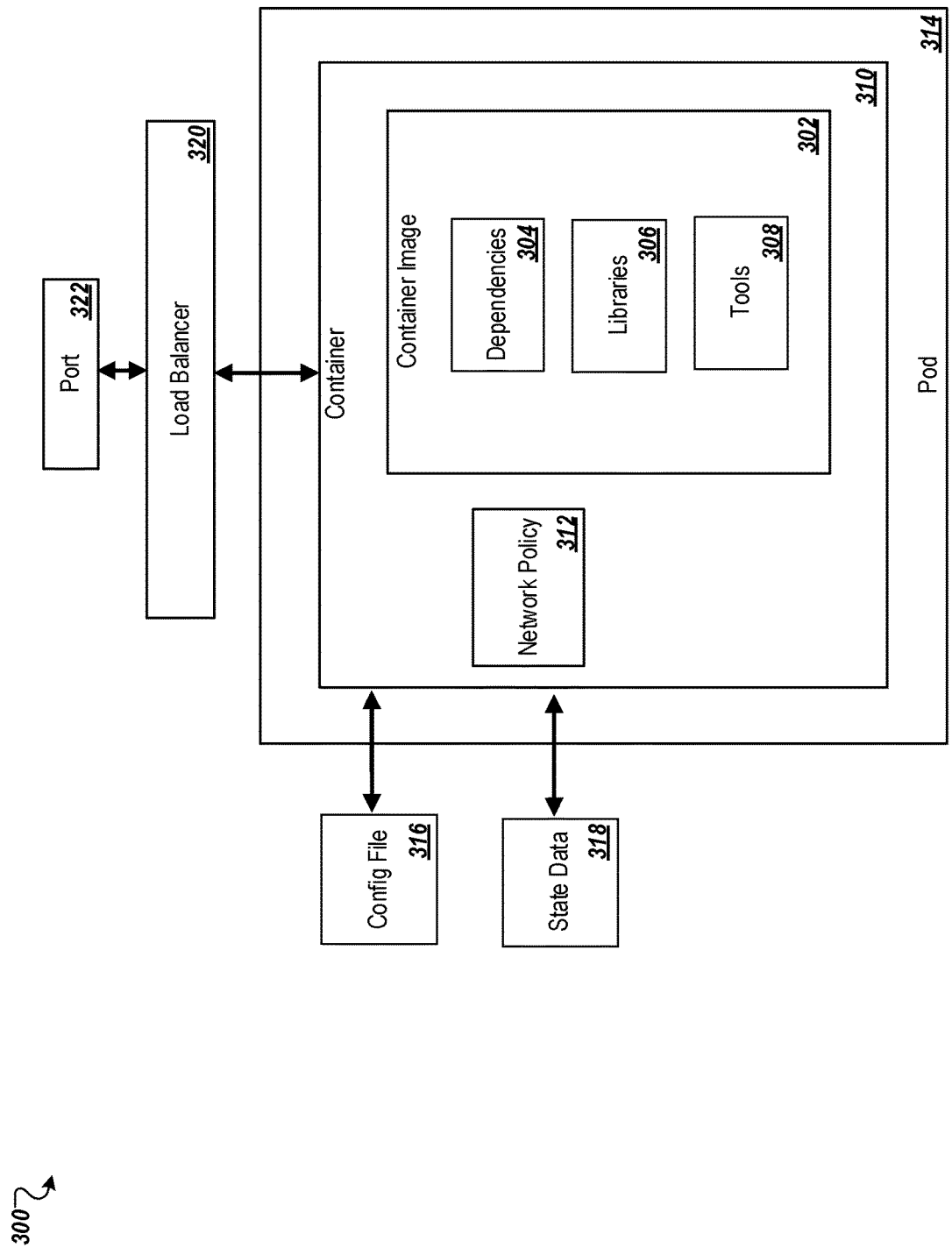
FIG. 3 is a diagram illustrating an example of a container and associated data.

FIG. 3 is a diagram illustrating an example container architecture 300. As shown, the architecture includes a container 310 in a pod 314, a configuration file 316, state data 318, a load balancer 320 used to balance the load or traffic over one or more containers including the container 310, and a port 322 in order to allow communication between the container 310 and other containers, external applications or functions, or users. Each of the containers 110a-110e and 210a-210l can be implemented using some or all of the features of the container architecture 300.

A pod, such as the pod 314, may be a management component that is used by a container management platform to organize and/or deploy one or more containers.

The container 310 includes a software image 302. The container 310 is running an instance of the software image 302. The software image 302 is associated with a specific application or function such as, for example, a server service. Accordingly, the container 310, when deployed, is running the specific application or function associated with the software image 302.

The software image 302 may include a variety of components. These variety of components may be components corresponding to the specific application or function associated with the software image 302. These variety of components may include dependencies 304, libraries 306, and/or tools 308. The dependencies 304 may include dependencies need by the specific application or function associated with the software image 302. The dependencies 304 may include specific versions of programming language runtimes and other software libraries. In some implementations, the dependencies 304 include the libraries 306. In some implementations, the dependencies 304 include the tools 308. The libraries 306 may include system libraries and/or system settings. The tools 308 may include system tools. The software image 302 may also include code for the specific application or function associated with the software image 302.

However, neither the software image 302 nor the container 310 that represents the instantiation of the software image 302 includes an operating system (OS). Instead the container 310 may run on the operating system of the underlying system such as, for example, the operating system of the host server 102 shown in FIG. 1 or the host server 202 shown in FIG. 2.

The container 310 also includes a network policy 312. The network policy 312 may specify how the container 310 and/or pod 314 is allowed to communicate with other containers, pods, and/or other network endpoints. For example, the network policy 312 may make the application or function of the container 310 only accessible from in the pod 314 and/or the container 310 itself. As another example, the network policy 312 may expose the application or function of the container 310 to only other containers, e.g. other containers in the same cluster, or only to specific other containers, e.g. specific other containers in the same cluster. As another example, the network policy 312 may make the application or function of the container 310 accessible from anywhere, e.g., the container 310 is made accessible outside of its associated cluster. In some implementations, the network policy 312 is located outside of the container 310 but in the pod 314.

The configuration file 316 may be read into the container 310. Accordingly, the configuration file 316 may be mounted to the containers 310. The configuration file 316 may include various parameters, may include an indication of the software image 302, may include instructions to pull the software image 302 from a collection of images stored on a repository, etc. The parameters in the configuration file 316 may include, for example, a cache size, capacity limits, port assignments, etc. The configuration file 316 may be used to effectuate the deployment of the container 310. The configuration file 316 may have been generated or modified by an operator, developer, or administrator of the container 310 or of a cluster that the container 310 is part of.

In some implementations, the configuration file 316 is embedded in the container 310 by, for example, an operator, developer, or administrator of the container 310 or of a cluster that the container 310 is part of.

In some implementations, the configuration file 316 is embedded in the software image 302 by, for example, an operator, developer, or administrator of the container 310 or of a cluster that the container 310 is part of prior to the instance of the container being run in a container.

The state data 318 may include, for example, session-based state data. Data from the container 310 may be added to the state data 318 during the deployment of the container 310. In some implementations, the state data 318 includes data in addition to session-based state data such as, for example, environment-based state data. If the container 310 were to crash or otherwise end, a system, e.g. the system 100 as shown in FIG. 1, could effectively redeploy the container 310 by deploying a new instance of the software image 302 and leveraging the state data 318 to bring the redeployed container to the previous state of the container 310.

FIG. 4 is a diagram illustrating an example process 400 for deploying new container instances. This can include transitioning from that is seamless, e.g., without downtime or unavailability, to client devices and other containers of the environment.

FIG. 4 also illustrates various events, shown as stages (A) to (C), with each representing a step in an example process for deploying new container instances. Stages (A) to (C) may occur in the illustrated sequence, or in a sequence that is different from the illustrated sequence. For example, some of the stages may occur concurrently.

The system, such as the system 100 shown in FIG. 1, may be able to deploy new container instances of corresponding applications without immediately replacing or ending existing container instances of those same corresponding applications such that the new container instances and the existing container instances can run in parallel. The system 100 may deploy these new container instances in the same container-based server environment, such as the same cluster, where the existing container instances have already been deployed. Although the existing container instances are not immediately replaced by the new container instances or immediately ended as a result of initiating the process for deploying the new container instances, the new container instances of the corresponding applications are meant to eventually replace the existing container instances of those same corresponding applications.

The system 100 shown in FIG. 1 may initiate the process of deploying the new container instances to replace the existing container instances for various reasons. For example, the system 100 may initiate the process of deploying a new container instance of a corresponding application due to the new container instances having an updated or different software image. The updated or different software image may represent a new version of the corresponding application. The updated or different software image may include new or modified dependencies, libraries, tools, settings, etc.

During the process of deploying the new container instances, while preparing the new container instances, the system 100 shown in FIG. 1—e.g. through load balancer services 408—may continue to provide requests to the existing container instances in a manner that is substantially equivalent to request allocation prior to the start of this deployment process. Similarly, during the process of deploying the new container instances, while the system 100 prepares the new container instances, the existing container instances may continue to process any received or previously received requests in a manner that is substantially equivalent to request processing prior to the start of this deployment process.

Once a new container instance of a particular application has been deployed, the system 100 shown in FIG. 1—e.g. through the load balancer services 408—may begin sending requests that would have been provided to the existing container instance of that application to the new container instance of that application. However, in some implementations, the system 100—e.g. through the load balancer services 408—may provide the new container instance of that particular application with only a portion of the requests that would have been provided to the existing container instance of that application due to, for example, differences between the new container instance and the existing container instance (e.g., the new and existing container instances using different software images, each corresponding with a different software version of the same application). Similarly, in some implementations, the system 100—e.g. through the load balancer services 408—may provide the new container instance of that particular application with one or more requests that would not have been provided to the existing container instance of that application due to, for example, differences between the new container instance and the existing container instance (e.g., the new and existing container instances using different software images, each corresponding with a different software version of the same application). When the new container instances begin receiving requests, they may start processing those requests.

Once a new container instance of a particular application has been deployed, the system 100 shown in FIG. 1—e.g. through the load balancer services 408—may stop providing requests to the existing container instance of that application. However, the system 100 might not immediately end the existing container instance once the new container instance of the same application has been deployed. For example, if the existing container instance still includes a queue of received requests, the existing container may continue to exist while it continues to process those requests.

After an existing container instance of a particular application has finished processing all of its previously received requests, the system 100 shown in FIG. 1 may determine that the existing application has finished process its requests and proceed to end the existing container instance of that application. In ending the existing container instance of that application, the system 100 has completed the deployment process of the new container instance of that same application.

In stage (A), existing containers 402a, 404a, and 406a are processing requests and new containers 402b, 404b, and 406b are being prepared in order to be deployed. The existing containers 402a, 404a, and 406a are processing requests provided to them through the load balancer services 408. The load balancing services 408 may include one or more load balancers. Using a load balancer may improve individual container performance and performance of the cluster 410 by spreading the load, e.g. request traffic, over the containers in the cluster 410. Processing requests may involve, for example, processing data, loading data, sending data, etc.

The container 402a is a container for a first application ("App 1"). The container 402a may be running an instance of a software image for a first version ("V1") of App 1. The container 404a is a container for a second application ("App 2"). The container 404a may be running an instance of a software image for a first version ("V1") of App 2. The container 406a is a container for a third application ("App 3"). The container 404a may be running an instance of a software image for a first version ("V1") of App 3.

The container 402b being prepared is another container for App 1. The container 402b may be configured to run an instance of a software image for a second version ("V2") of App 1. The second version may correspond with an upgraded software image or otherwise modified software image for App 1. The second version may correspond with a new software image for App 1.

The container 404b being prepared is another container for App 2. The container 404b may be configured to run an instance of a software image for a second version ("V2") of App 2. The second version may correspond with an upgraded software image or otherwise modified software image for App 2. The second version may correspond with a new software image for App 2.

The container 406b being prepared is another container for App 3. The container 406b may be configured to run an instance of a software image for a second version ("V2") of App 3. The second version may correspond with an upgraded software image or otherwise modified software image for App 3. The second version may correspond with a new software image for App 3.

In preparing to deploy the new containers 402b, 404b, and 406b, the cluster 410 may pull the upgraded, modified, or new images for App 1, App 2, and App 3, respectively. The cluster 410 may pull the images from, for example, a software image repository such as the repository 104 shown in FIG. 1 or the repository 204 shown in FIG. 2.

The cluster 410 may start preparing the new containers 402b, 404b, and 406b in response to receiving instructions from, for example, an operator, developer, or administer of the cluster 410. The cluster 410 may start preparing the new containers 402b, 404b, and 406b in response to receiving upgraded, modified, or new images for App 1, App 2, and App 3 from, for example, an operator, developer, or administer of the cluster 410. The cluster 410 may start preparing the new containers 402b, 404b, and 406b in response to a triggering event, such as detecting that upgraded, modified, or new images for App 1, App 2, and App 3 are available.

In stage (B), the containers 402*b*, 404*b*, and 406*b* are deployed and the load balancer service 408 starts feeding requests to the containers 402*b*, 404*b*, and 406*b* for processing. The requests sent to the containers 402*b*, 404*b*, and 406*b* may correspond with requests that may have been sent to the containers 402*a*, 404*a*, and 406*a*, respectively. For example, the container 402*b* may receive requests from the load balancer service 408 that would have been sent to the container 402*a*. As another example, the container 404*b* may receive requests from the load balancer service 408 that would have been sent to the container 404*a*. As another example, the container 406*b* may receive requests from the load balancer service 408 that would have been sent to the container 406*b*.

In stage (B), the containers 402*a*, 404*a*, and 406*a* continue to process requests that they had previously received from the load balancer service 408. However, the containers 402*a*, 404*a*, and 406*a* stop receiving new requests from the load balancer service 408.

In stage (C), the containers 402*a*, 404*a*, and 406*a* finish processing their respective requests and are terminated. The cluster 410 may end each of the containers 402*a*, 404*a*, and 406*a* upon determining that the containers 402*a*, 404*a*, and 406*a* have finished processing their requests respectively. For example, once the container 402*a* finishes processing previously received requests, the cluster 410 terminates the container 402*a*. As another example, once the container 404*a* finishes processing previously received requests, the cluster 410 terminates the container 404*a*. As another example, once the container 406*a* finishes processing previously received requests, the cluster 410 terminates the container 406*a*.

The containers 402*b*, 404*b*, and 406*b*, which remain active, continue processing requests from the load balancer service 408. As a result of the process shown in FIG. 4, the applications 1-3 have been upgraded to newer versions without interrupting the availability of the applications, and in a manner that is transparent to end users and other containers. The containers 402*b*, 404*b*, and 406*b* running the updated software images continue to operate within the server environment.

Figure 5:
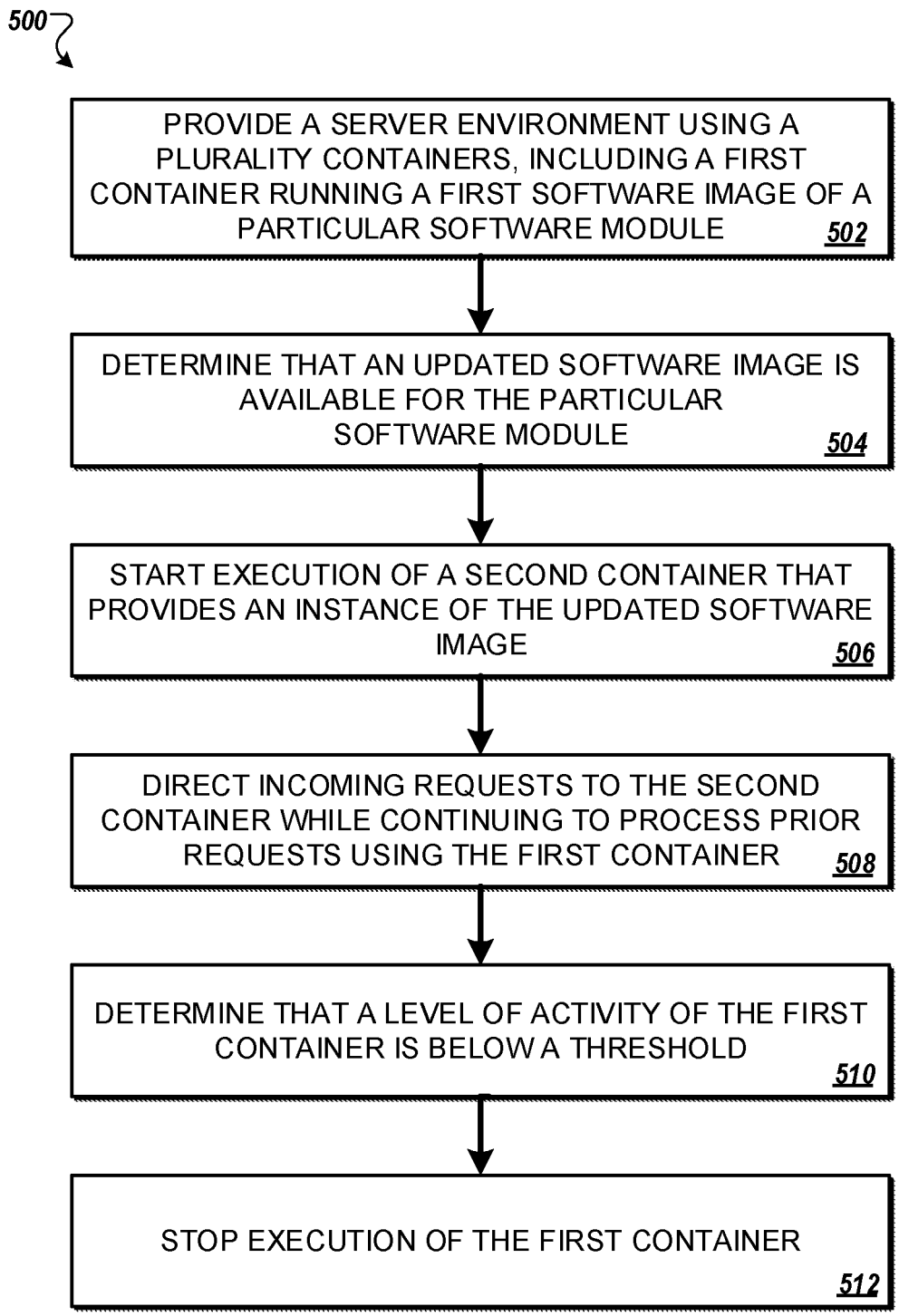
FIG. 5 is a flow diagram showing an example of a process 500 for loading containers in a container-based server environment.

FIG. 5 is a flow diagram showing an example of a process 500 for loading containers in a container-based server environment. The process 500 shows how a container of a container-based server environment may be updated with minimal or no interruption of service provided by the server environment. Briefly, in a server environment running a first container, a new version of the first container (e.g., a version that is patched, is updated, has changed settings, etc.) can be automatically loaded and run in parallel with the first container. After the new version of the container is running, incoming requests are routed to the new container. Meanwhile, earlier requests and tasks in progress at the first container continue to be processed by the first container, in many cases to completion. Once the load at the first container falls below a predetermined level, the first container is stopped and removed from the server environment. This process enables the system to effectively replace a container with the old software image with a container based on a new software image, without any interruption in service.

The system provides a server environment using a plurality containers that provide instances of different software modules (502). The different software modules are different services or different applications. The plurality of containers can include a first container running a first software image of a particular software module. The containers can be run on a cluster of multiple processing nodes, with resources of the cluster of multiple processing nodes being allocated among the respective containers. The processing nodes may represent actual processors or virtual processing nodes.

The system determines that an updated software image is available for the particular software module (504). This may occur automatically, for example, as triggered by the system based on detecting a new software image, or detecting that a timestamp or version code for a software image has changed. For example, the system may detect that a timestamp or image identifier for a software image in an image repository is newer than the timestamp or identifier for the software image of the first container. Metadata of the image repository may similarly indicated when a new version is made available. The determination may be based on user input, such as user input that selects a software image or otherwise manually initiates an update to a software image for an application. The determination may be based on a message, such as from a software image repository server or other system, indicating that the updated software image is available.

As an example, the system may determine a first version code associated with a software image of the particular software module that is running in the first container. The system may determine a second version code associated with the updated software image in a software image repository. The system may determine that the second version code indicates a more recent version than the first version code. When version codes are incremented or otherwise follow a certain convention to be assigned, the system may use data indicating the convention to detect a newer version (e.g., determining that a version code is higher than the previous version code).

In response to the determining that the updated software image is available, the system performs operations of steps (506) to (512) discussed below. The steps to detect the availability of the updated software image and to create and switch to using the updated software image can be performed automatically by the system. As an alternative, these steps may be manually initiated based on user input, such as when a user selects or creates an updated software image to be used in the server environment.

The system starts execution of a second container that provides an instance of the updated software image (506). For example, the system generates a new container based on the updated software image, allocates resources to the new container, and uses the new container as the second container.

After starting execution of the second container, the system directs incoming requests to the second container (508). The system continues to process, using the first container, one or more requests that were received before starting execution of the second container. As a result, both the first container and the second container, which may both represent different versions of the same application, operate concurrently to process their respective sets of requests. For example, requests to initiate new sessions can be provided to the second container, which will handle the new sessions going forward. Meanwhile, the system continues to provide communications related to existing sessions of the particular software module to the first container. As a result, the first container and the second container, representing instances of different versions of the same application or service, can concurrently process data for their respective sessions which are open concurrently.

The system determines that a level of activity of the first container is below a threshold (510). The system can monitor the load or other activity of the first container, e.g., the number of tasks in progress, a number of tasks in a queue of pending jobs, a number of network connections open, an amount of network traffic, a load level, a resource usage (e.g., CPU utilization, RAM usage, etc.), and so on. For example, the system can determine that the level of activity of the first container is below a threshold because a number of tasks or sessions in progress for the first container is below a threshold. The system may monitor various operational or performance characteristics of the first container to determine the current level of activity, including network traffic, executing processes, network connections, resource utilization, and so on.

In response to determining that the level of activity of the first container is below the threshold, the system stops execution of the first container (512). The system can also remove the first container from the server environment. For example, the system can deallocate resources from the first container and can remove the first container from the server environment, thus reclaiming the memory and other resources that were used by the first container.

In general, starting execution of a second container, directing incoming requests to the second container, and stopping execution of the first container are performed such that the server environment transitions from using the first software image to using the updated software image without causing unavailability of the particular software module and in a manner that is transparent to client devices and/or other containers that make use of the particular software module.

In some implementations, associated with stopping the first container, the system provides notifications to client devices with pending jobs or sessions that their sessions or jobs have been cancelled and should be issued again. In other implementations, the system automatically determines which requests to the first container are unfulfilled and re-issues the unfulfilled requests to the second container. As discussed below, this can enable the requests to be addressed by the second container without requiring client devices to re-issue their requests.

In some implementations, after starting execution of the second container, the system transfers one or more communication sessions of the first container to the second container. The second container then continues the one or more communication sessions that were initiated with the first container. The transfer may occur in response to determining that the level of activity of the first container is below the threshold. For example, when the system determines that the activity level on the first container has fallen below a threshold level (e.g., a predetermined amount of active sessions, active users, pending tasks, etc.), the system may stop processing on the first container and shift future processing to the second container. This may be done in various ways. As an example, a record of active sessions of the first container, along with related information for the sessions (e.g., user identifiers, authentication or authorization tokens, session identifiers, working data sets, etc.) can be provided to the second container. As a result, the second container can open sessions that match the existing sessions. As another option, with the session information, the second container may use the session information to create new sessions for the same users or devices as the old sessions, and can provide the new session information to the users or devices.

If a request is provided to the first container but not yet fulfilled by the first container when the first container is stopped, the request and any associated data can be provided to second container. For example, the system can effectively repeat or re-issue, to the second container, the request that was previously issued to the first container, with the second container being provided the session history and other data that may be needed to fulfill the request. The second container can then provide a response to a request previously routed to the first container.

In some cases, the system may extract and transfer state information about work in progress at the first container to the second container. As an example, consider a case where the first container is has generated 100 pages of a 500-page report when the system determines to stop the first container. The system can transfer the data for the report generation task, such as temporary files, cached data, partially completed objects, and so on to the second container and request that the second container complete the task. This may involve the system generating a customized request (e.g., different from the initial request from the client device) that refers to the resources representing partial work completed and limits the amount of processing requested to the amount still needed for completion.

In some implementations, the server environment is configured to provide an analytics service to a plurality of client devices and over a computer network using interactions of the plurality of modules running in the respective containers. The server environment may be configured to perform analytics tasks such as generating a visualization, responding to a query, generating a report or dashboard, and/or providing access to a database.

The server environment can provide business intelligence applications and services. In some implementations, the plurality of containers includes containers providing external-facing interfaces accessible over a computer network and containers that provide internal interfaces configured to communicate only with other containers in the server environment. The plurality of containers includes a container for each of: a front-end interface module configured to receive user-initiated requests over a network; a library module configured to provide access to a set of documents available through the server environment; one or more analytics modules configured to process queries, generate reports, perform online analytical processing; a collaboration module configured to permit comments and/or notifications to be shared among users of the server environment; and a data access module configured to retrieve information from one or more data sources that include at least one database, data cube, or data set.

Figure 6:
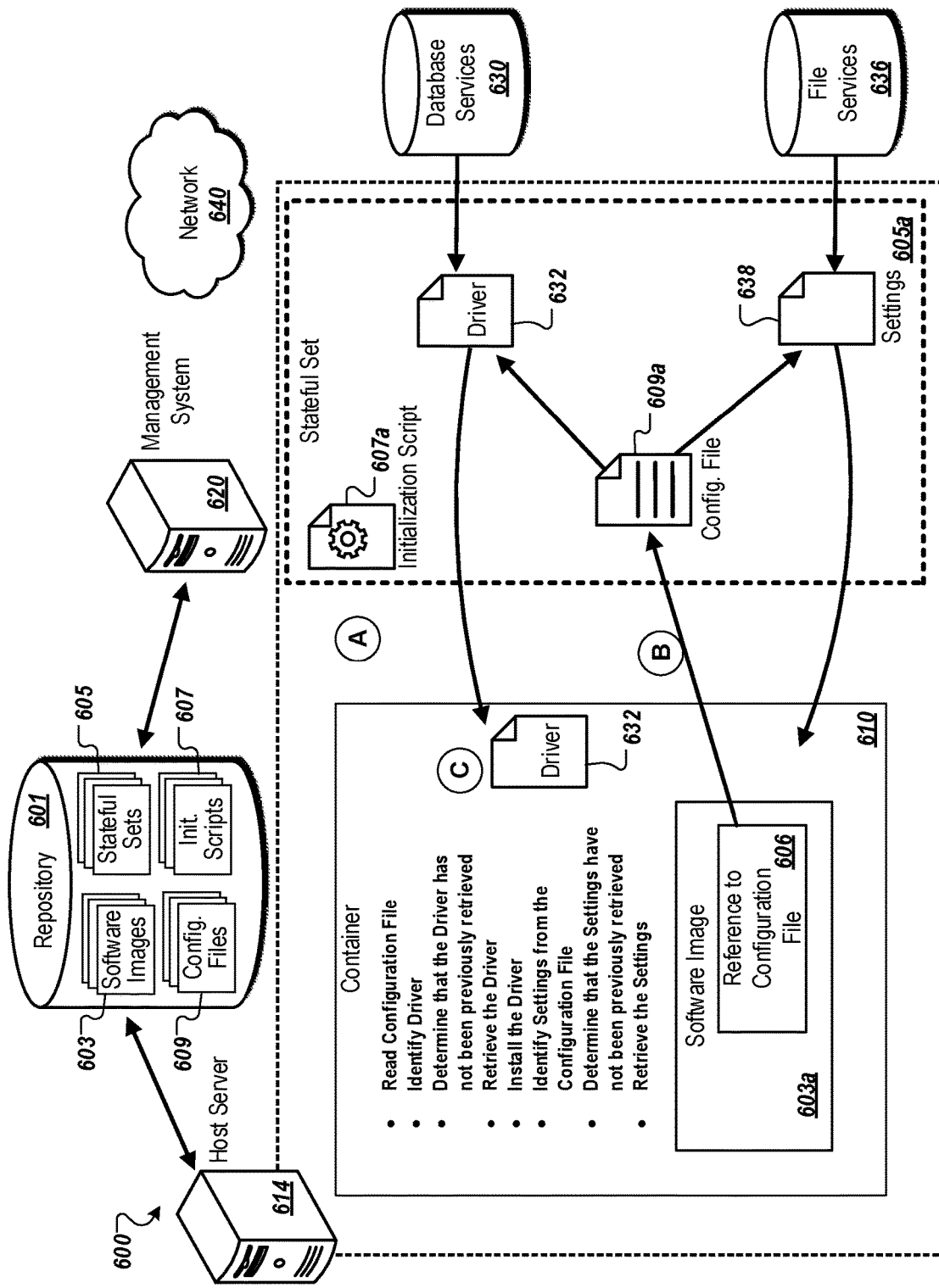
FIG. 6 is a diagram showing an example system for integrating containers with external elements.

FIG. 6 is a diagram showing an example system 600 for integrating containers with external elements. In the example, the operation of a container 610 pulls in elements external to the container 610, which updates or customizes the container 610 relative to what the container 610 would have based on the software image used to load the container 610. For clarity in illustration, FIG. 6 shows only a single container 610 and a single stateful set 605*a* of data corresponding to the container 610. However, the system 600 generally includes multiple containers, each with a different corresponding stateful set, that operate concurrently and interact to provide a server environment.

The system 600 may create and manage containers that are configured to pull external configuration information and resources into the containers. Accordingly, system 600 permits modifying containers and modifying the instances of the software images running as the containers. The system 600 permits modifying containers without requiring new instances of the software images to be run. For example, the system 600 can modify the container 610 (which is an instance of the software image 603*a*) without requiring that a new version of the software image 603*a* be generated prior to the deployment or running of the container 610, without requiring a new instance of the software image 603a, and without a new container be deployed.

In order to generate and deploy the containers, the system 600 may leverage one or more container engines or technologies such as, for example, Docker and/or CoreOS rkt. In order to arrange the containers to perform a variety of different server functions, the system 100 may leverage one or more container orchestration engines (COEs) such as, for example, Kubernetes, Mesos, and/or Docker Swarm.

The system 600 includes a host server 614 and a management system 620. The host server 614 may communicate the management system 620 over a network 640. The network 640 can include public and/or private networks and can include the Internet. The host server 614 includes processing nodes that can run containers, and also runs an operating system that the containers run on. The management system 620 can perform various management functions such as monitoring running containers, storing software images and state data, coordinating configuration data and updates to running containers and software images, and so on. In some implementations, the functions of the management system 620 are integrated with and performed by the host server 614. In some implementations, the system 600 is the system 100 as shown in FIG. 1. In some implementations, the system 600 is the system 200 as shown in FIG. 2.

The system includes a repository 601 of information used to create and manage containers. The host server 614 and/or the management system 620 can retrieve information from and store information to the repository 601 in the course of creating, running, and managing a container-based environment. The information in the repository 601 includes software images 603 that can be run as containers by the host server 614. Along with the software images 603, the repository 601 can include information such as stateful sets 605, initialization scripts 607, and configuration files 609. In some implementations, the repository 601 is the repository 104 shown in FIG. 1. In some implementations, the repository 601 is the repository 204 shown in FIG. 2.

The stateful sets 605 include data indicating the state of a container. This state information can include external elements relied on by a container, data sets used by the container, and so on. The stateful sets 605 can include copies of any or all settings or changes that have been made to a software image 603 to reach the current state of the container. In other words, the stateful sets 605 can each include all information needed to duplicate the state of a container, for example, to create a new container that is identical to or that has the same configuration as a previous container that may no longer exist. Each container that is run by the host server 614 has a stateful set, and the host server 614 and/or the management server 620 can maintain a backup copy of the running stateful set in the repository 601, either on an ongoing basis or in response to certain events, such as before removing a container.

The initialization scripts 607 each specify a set of operations that the host server 614 performs when creating and starting a container. As discussed below, when the host server 614 creates a new container based on a software image 603, the host server 614 runs the initialization script 607a that corresponds to the software image 603 to configure the container. Of course, different initialization scripts 607 may configure a single software image 603 in different ways to create different containers for different purposes. Typically, the initialization scripts 607 are used only during the creation and initial starting of the container, and is not used as the container runs.

The configuration files 609 specify settings for containers. The settings specified in a configuration file 609 can be used by the host server 614 to create and start a container, e.g., when processing the initialization script 607 to create and start a container. For example, the initialization script 607 may include references to a configuration file 609 and may cause the host system 614 to apply settings as specified in the configuration file 609. The configuration file 609 may be additionally or alternatively referred to and used by a running container. As discussed further below, a container can read settings or other data from its corresponding configuration file 609. This can allow a container to adjust its own settings from time to time, rather than rely on the host server 614 to initiate changes. This also provides flexibility for just-in-time configuration changes made only under certain circumstances, such as making configuration changes only when a particular function is needed or only when a particular situation is detected by the container. In addition, the configuration file 609 can be dynamically updated by the host server 614 and/or the management system 620 while the container is running, and the container can apply those changes without needing to interrupt service or reload the container.

A set of stored elements 605, 607, 609 can be stored for and associated with each software image 603 or for different containers, e.g., different instances of software images 603. For example, for a particular software image 603 configured to only run as one container at a time, there may be a single corresponding stateful set 605, a single corresponding initialization script 607, and a single corresponding configuration file 609. On the other hand, when multiple containers are used based on a particular software image 603, or when a single software image 603 is customized upon execution in different ways for different containers, there may be multiple stateful sets 605, multiple initialization scripts 607, and multiple configuration files 609 for a single software image 603.

The host server 614 may associate one or more elements within the set of stored elements 605, 607, 609 with the container 610. For example, the host server 614 may associate the stateful set 605a with the container 610. The host server 614 may store a copy of the stateful set 605a within the repository 601 such that the host server 614 can replicate a current state of the container 610 for a another container running an instance of the software image 603a.

The management system 620 may be a computing system including one or more computing devices. The management system 620 may be accessible to one or more system developers, operators, and/or administrators.

The host server 614 is a server system and can include one or more computing devices. In some implementations, the host server 614 is located on the premises of an organization, e.g., on-premises. In other implementations, the host server 614 is not located on premises. For example, the host server 614 may be part of a cloud provider, e.g., a third-party server system, such as, for example, Amazon Web Services (AWS), Microsoft Azure, or Google Cloud Platform (GCP). In some implementations, the host server 614 and the management system 620 are part of single computer system. In some implementations, the host server 614 is the host server 102 as shown in FIG. 1. In some implementations, the host server 614 is the host server 202 as shown in FIG. 2.

In the example of FIG. 6, the host server 614 runs a container 610, which is a running instance of a software image 603a. The software image 603a represents one of the software images 603 from the repository 601. This container 610 has an active stateful set 605a representing data outside the container 610 that is associated with and used by the container 610. In the system 600, each container has an associated stateful set that is active. The host server 614 and/or the management system 620 can store a copy of the stateful set 605*a*, potentially with other information extracted from the container 610 to specify the current state of the container 610, as one of the stateful sets 605 in the repository 601. Because the data in the stateful set 605*a* is maintained even after the container is stopped and removed from the system, the information stored there can be later used to re-create a new container with the same state that existed earlier.

In the example, the stateful set 605*a* includes various elements that are relied on by the container 610 but are not included in the container 610, e.g. they are external to the container 610. These elements can include, for example, executable or interpretable software (e.g., code, software modules, libraries, drivers, etc.), data, and configuration information. For example, the stateful set 605*a* includes a driver 632 that the container 610 needs in order to access database services 630. The stateful set 605*a* also includes configuration settings 638 from the file services 636. The configuration settings 638 may be used to generate or update the configuration file 609*a*. The configuration settings 638 may be used by the container 610 to obtain a particular configuration of the container 610. The stateful set 605*a* may include data received from different sources. For example, the data in the stateful set 605 may be placed in the stateful set by the operations of an initialization script 607*a* for the container 610, by the execution of the container 610 itself, by the host server 614 and/or the management server 620, and/or by external systems such as the database services 630 and the file services 636. Data may be provided to the stateful set 605*a* over the network 640.

The system 600 may further include database services 630 and file services 636. The database services 630 and the file services 636 may send data to and/or receive data from the stateful set 605*a* over the network 640. The database services 630 may be a persistent data storage. The database services 630 may include various database services drivers including the driver 632. The file services 636 may be a persistent data storage. The file services 636 may include various configuration settings including the configuration settings 638.

As previously explained, a software image may refer to a snapshot, or template, from which new containers can be started. In serving as a snapshot or template, a single software image can be used to deploy multiple containers, with each container running a different instance of the same software image. A software image may include all of the components necessary for running a container. These various components may include, for example, dependencies such as libraries and/or tools, code, a configuration file, one or more drivers, and/or settings. Nevertheless, in some implementations, one or more elements needed for at least some functions or operations of a container may be omitted and placed instead in a corresponding stateful set for the software image or for a specific container, using techniques discussed further below. The software image may also contain references, pointers, or links to objects such as files outside of the software image and/or the corresponding container. A software image may be composed of a set of read-only layers. A software image may be modified, for example, by adding a new layer to the set of read-only layers. A software image may be configured to provide a particular application, service, or function.

As previously explained, a container is defined by a software image and a stateful set. Here, the stateful set 605 may include the initialization script 607 and/or the configuration file 609 for the container. Using containers, the system 600 can run multiple instances of the same software image 603 as different containers.

The techniques disclosed in this document can be used to improve server management. By configuring containers to pull in configuration information or external resources, the containers and the instances of the images running on the containers can be updated without requiring that new instances of the software images be run or that new containers be deployed. With this functionality, system administrators, developers, and/or operators have increased management capabilities to customize deployed containers. With this functionality, the underlying software images do not need to be modified or replaced, even to support later added elements or features. Accordingly, particular deployed containers can be customized without affecting other containers that running different instances of the same underlying software images.

The example of FIG. 6 shows how the container 610 can be created and customized using elements external to the software image 603*a* that the container 610 runs. In stage (A), the host server 614 creates and starts the container 610. To do this, the host server 614 creates a new container, loads the software image 603*a* in the new container, and runs the initialization script 607*a* corresponding to the software image 603*a*. Thus the container 610 is deployed on the host server 614 and is running an instance of the software image 603*a*. In some implementations, the initialization script 607*a* is provided by the management system 620.

In stage (B), the operations of the container 610 cause it to look outside the container 610 to obtain additional resources and customizations. The software image 603*a* is configured to cause the container 610 to look for external resources. In particular, the software image 603*a* may include a reference 606 that points to a configuration file 609*a*. This configuration file 609*a* may have a standard name, format, and location that the software image 603*a* references in order to obtain further configuration information. The reference 606 may be, for example, a reference, a pointer, or a link to the configuration file 609*a*. The reference 606 may specify that configuration file 609*a* should be accessed upon starting the container 610, when performing a particular function. Similarly, the reference 606 may specify a particular portion or item of data to obtain from the configuration file 609*a*.

Based on the reference 606, the container 610 initiates access to the configuration file 609*a*. The configuration file 609*a* may instruct the software image 603*a* to perform various actions. For example, due to information specified in the configuration file 609*a*, the software image 603*a* may retrieve or read data from a stateful set 605*a*, or retrieve data outside the stateful set 605*a* and add it to the stateful set 605*a*. The stateful set 605*a* is external to the container 610, e.g., running instance of the software image 603*a*. Nevertheless, based on data in the configuration file 609*a*, the container 610 may bring data from the stateful set into the container 610. As another example, in response to reading the configuration file 609*a*, the software image 603*a* may refer to one or more modules outside of the container 610, such as third-party modules, in order to perform one or more functions.

The software image 603*a* may include instructions to look outside the container 610, e.g. to the configuration file 609*a* using the reference 606. The instructions may cause the container to look outside of the container 610 on-demand (e.g., when a specific function is used), substantially continuously (e.g., to detect changes in the configuration file 609*a*), or periodically, e.g., every 30 seconds, every five minutes, every hour, every day, etc. The instructions may cause the container 610 to access an external element in response to the detection of a triggering event. For example, the instructions may cause the container 610 to look to the configuration file 609*a* using the reference 606 upon initialization of the container 610.

The software image 603*a* may include instructions to obtain or use external elements upon initialization of the container 610. These instructions may be part of the settings of the software image 603*a*. A subset of these instructions may be part of the configuration file 609*a*. For example, the software image 603*a* may contain instructions to look outside of the container 610 using the reference 606 upon startup. In this example, when the software image 603*a* reads the configuration file 609*a*, the configuration file 609*a* may instruct the running instance of the software image 603*a* to reread the configuration file 609*a* periodically, e.g., every minute, every hour, every day, etc. As another example, when the software image 603*a* looks outside the container 610 and reads the configuration file 609*a*, the configuration file 609*a* may instruct the running instance of the software image 603*a* to reread the configuration file 609*a* in response to the occurrence of a triggering event, e.g., detected update to one or more resources, detected change to the stateful set 605*a* by the management system 620, etc. When the container 610 accesses external elements it may look for new or modified configuration information or new or modified external resources.

In stage (C), based on information in the configuration file 609*a*, the container 610 obtains and loads a driver 632 from the stateful set 605*a*. In the example, the starting of the container 610 causes the container 610 to follow the reference 606 and read the configuration file 609*a*, which in turn identifies the driver 632*a* and its location. For example, the configuration file 609*a* points to the driver 632 and the configuration settings 638. When the software image 603*a* looks to the configuration file 609*a* using the reference 606, the software image 603*a* is referred to the driver 632 and the configuration settings 638.

The driver 632 may have already existed within the stateful set 605*a* at the time that the container reads the configuration file 609*a* and is referred to the driver 632 and the settings 638. Alternatively, the container 610 may request the driver 632 from the database services 630 and/or may request the settings 638 from the file services 636.

The configuration file 609*a* may include various parameters, may include an indication of the software image 603*a*, and/or may include references, pointers, and/or links to resources such as the driver 632 and the settings 638. The parameters within the configuration file 609*a* may include various settings for the software image 603*a* and/or the container 610. The parameters within the configuration file 609*a* may include, for example, a cache size, capacity limits, port assignments, etc.

In looking outside of the container 610 to the configuration file 609*a*, the software image 603*a* and/or the container 610 read the configuration file 609*a*. The container 610 and/or the software image 603*a* may determine whether or not the configuration file 609*a* has been updated since it was last read by the software image 603*a* and/or the container 610. If the configuration file 609*a* is the same as the one previously read, the software image 603*a* and/or the container 610 may wait to take further action. For example, the software image 603*a* and/or the container 610 may wait a period of time until checking the configuration file 609*a* again and/or wait until a triggering event occurs.

In reading the configuration file 609*a*, the software image 603*a* and/or the container 610 may identify the driver 632 and the configuration settings 638 due to the configuration file 609*a* pointing to both of these resources. In reading the configuration file 609*a*, the software image 603*a* and/or the container 610 may identify additional resources including external resources, settings that are stored as part of the configuration file 609*a*, and/or instructions for the software image 603*a* and/or the container 610 to take.

The software image 603*a* and/or the container 610 may determine whether the driver 632 should be installed on the container 610 and/or the software image 603*a*. This determination may be based on whether or not the container 610 and/or the running instance of the software image 603*a* has previously retrieved the driver 632, and/or on whether the driver 632 installed on the container 610 and/or the software image 603*a*. For example, the software image 603*a* and/or the container 610 may make this determination by comparing the driver 632 with a list of one or more currently installed drivers, or with a list of one or more previously retrieved drivers.

As an example, if the software image 603*a* and/or the container 610 determines that the driver 632 has already been installed in the container 610 and/or the running instance of the software image 603*a*, then the software image 603*a* and/or the container 610 will not retrieve the driver 632 and will not install it. However, if the software image 603*a* and/or the container 610 determines that the driver 632 has not yet been installed in the container 610 and/or the running instance of the software image 603*a* or previously retrieved, then the software image 603*a* and/or the container 610 will retrieve the driver 632 and will install the driver 632 on the container 610 and/or the running instance of the software image 603*a*.

Similarly, the software image 603*a* and/or the container 610 may determine whether the configuration settings 638 should be retrieved. This determination may made based on whether or not the container 610 and/or the running instance of the software image 603*a* have previously obtained the configuration settings 638. For example, the software image 603*a* and/or the container 610 may make this determination by comparing the configuration settings 638 with configuration settings that are currently implemented by the software image 603*a* and/or the container 610, and/or with configuration settings that were previously retrieved by the software image 603*a*.

As an example, if the software image 603*a* and/or the container 610 determines that the configuration settings 638 have already been retrieved by the software image 603*a* and/or the container 610, then the software image 603*a* and/or the container 610 will not retrieve the configuration settings 638. However, if the software image 603*a* and/or the container 610 determines that the configuration settings 638 have not yet been retrieved, then the software image 603*a* and/or the container 610 will retrieve the configuration settings 638 to be used by the container 610 and/or the running instance of the configuration image 603*a*.

In some implementations, the container 610 and/or the software image 603*a* does not make a determination as to whether the resources have previously been retrieved and/or implemented. For example, the container 610 and/or the software image 603*a* may not make a determination as to whether the driver 632 has been previously retrieved, as to whether the driver 632 is currently installed, as to whether the configuration settings 638 have previously been retrieved, as to whether the configuration settings 638 are the same as the configuration settings that are currently implemented, etc. Instead, the container 610 and/or the software image 603a may retrieve and install the driver 632 despite what driver, if any, is currently installed. Similarly, the container 610 and/or the software image 603a may retrieve the configuration settings 638 and replace any existing configuration settings, if any, with the configuration settings 638.

As shown, the software image 603a and/or the container 610 retrieves both the driver 632 and the configuration settings 638. The software image 603a and/or the container 610 also installs the driver 632 once it has been retrieved. The software image 603a and/or the container 610 may implement the configuration settings 638 once they have been retrieved.

As shown, the software image 603a and/or the container 610 compares the driver 632 with existing drivers and determines that the driver 632 is not within the existing drivers of the running instance of the software image 603a.

Based on the determination that the running instance of the software image 603a should obtain the driver 632, e.g. based on the determination that the driver 632 is not within the existing drivers of the running instance of the software image 603a, the running instance of the software image 603a retrieves the driver 632 and installs it.

As shown, the software image 603a and/or the container 610 software image compares the configuration settings 638 with existing configuration settings and determines that the configuration settings 638 have not been previously retrieved or do not match the existing configuration settings of the running instance of the software image 603a.

Based on the determination that the running instance of the software image 603a should obtain the configuration settings 638, e.g. based on the determination that the configuration settings 638 have not been previously retrieved or do not match the existing configuration settings of the running instance of the software image 603a, the running instance of the software image 603a retrieves the configuration settings 638.

In some implementations, the container 610 initially using a configuration provided by the software image 603a. For example, the software image 603a may include its own configuration file that the container 610 refers to once the container 610 is running an instance of the software image 603a. In this example, the reference 606 may be part of the configuration file on the software image 603a.

In these implementations, the container 610 may change the configuration it is using. That is, for example, the container 610 may stop using the configuration provided by the software image 603a and start using a configuration provided by an external element. The external element may be a library, a file, an executable, a driver, or a code. As an example, once the software image 603a or the container 610 looks outside the container 610 using the reference 606, the container 610 may stop referring to a configuration file contained within the software image 603a and start referring to the configuration file 609a. In this example, the software image 603a or the container 610 may retrieve the configuration file 609a and incorporate it into the container 610.

In some implementations, changing the configuration of the container 610 includes obtaining a new software module to replace another software module. For example, the software image 603a may include a first software module and may be configured to use the software module, e.g. when the container 610 is running an instance of the software image 603a. In this example, the software image 603a may include the first software module. In this example, changing a configuration of the container 610 may include obtaining a second software module and using the second software module instead of the first software module on the software image 603a. The second software module may be an upgraded version of the first software module.

In these implementations, the software image 603a may identify the new software module using an external element. For example, the software image 603a or the container 610 may look outside the container 610 using the reference 606 to identify and read in the contents of the configuration file 609a. In this example, the contents of the configuration file 609a may point to a location external of the software image 603a. The location may correspond with a new software module, e.g. a second software module, where a first software module may be located within the software module 603a. In this example, the software image 603a or the container 610 may retrieve the new software module from the location external to the software image. The software image 603a or the container 610 may proceed to incorporate the new software module into the container 610, thereby changing the configuration of the container 610.

In some implementations, changing the configuration of the container 610 includes applying one or more settings to the container 610. For example, the software image 603a or the container 610 may look outside the container 610 using the reference 606 to identify and read in the contents of the configuration file 609a. In this example, the container 610 may determine one or more settings from the configuration file 609a. The software image 603a or the container 610 may proceed to apply the one or more settings to the container 610, thereby changing the configuration of the container 610.

In some implementations, the container 610 accesses the configuration file 609a each time a condition is satisfied. The condition may include the invocation of a particular function performed by the container 610. The container 610 may access the configuration file 609a in order to determine whether further changes to the container 610 are needed based on the current contents of the configuration file. For example, the container 610 may access the configuration file 609a a first time and read in its contents. In this example, the container 610 may be configured to access the configuration file 609a again after a condition is met, e.g. a certain amount of time has passed since the configuration file 609a was last accessed. The container 610 may determine that the contents of the configuration file 609a have changed since the configuration file 609a was last accessed. The container 610 may incorporate those changes into the container 610 or may use those changes to identify and/or obtain external elements.

Figure 7:
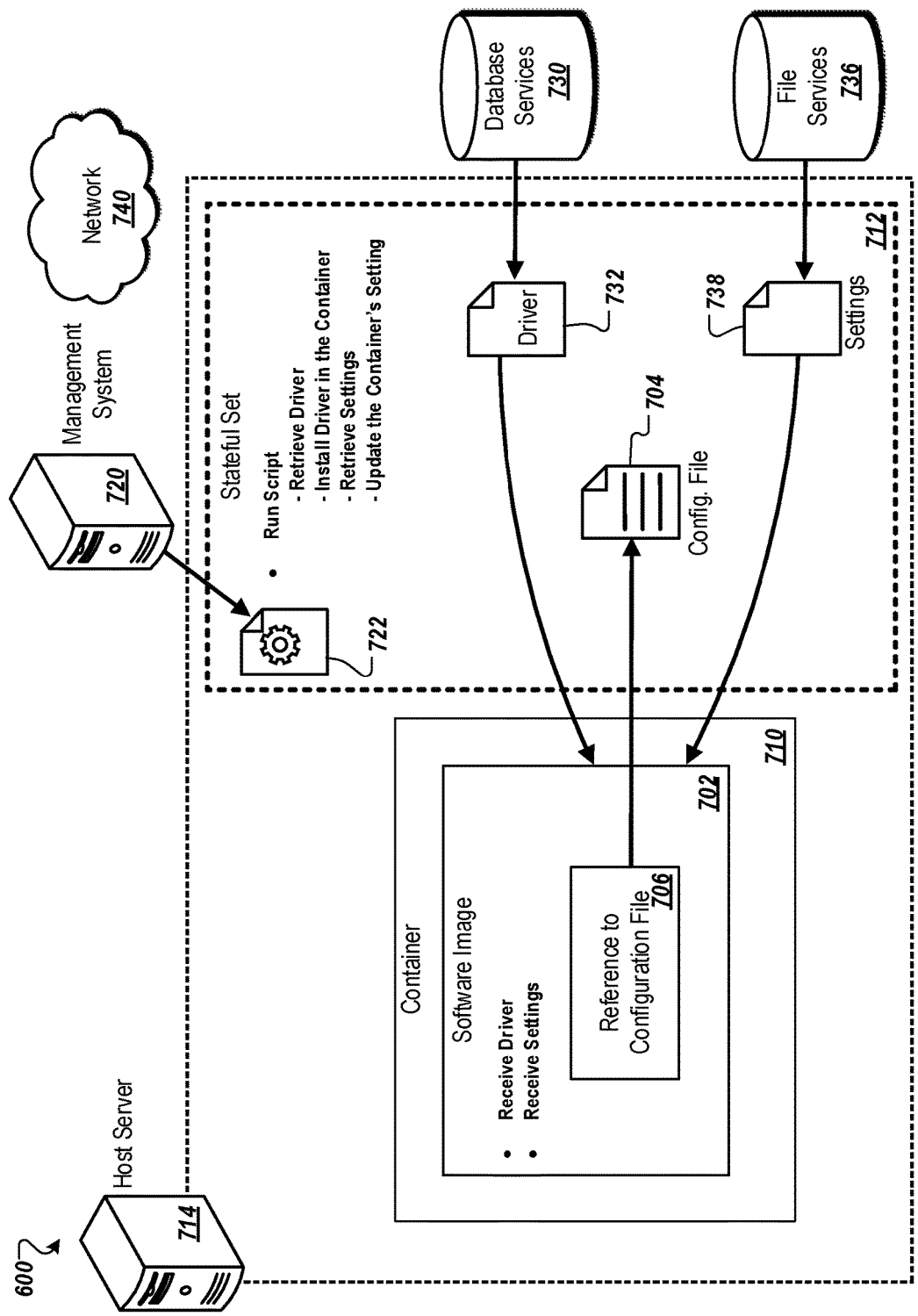
FIG. 7 is another diagram showing an example system for integrating containers with external elements.

FIG. 7 is a diagram showing an example system 700 for integrating containers with external elements, where external elements are pushed into a container 710. The system 700 may deploy containers that are configured to pull new or updated configuration information and to receive resources at the containers or into instances of images running on the containers. Accordingly, system 700 permits modifying containers and modifying the instances of the software images running on the containers. The system 700 permits modifying containers and modifying the instances of the software images running on the containers without requiring new instances of the software images to be run. For example, the system 700 permits modifying the running instance of the software image 702 without requiring that (i) a new version of the software image 702 be generated prior to the deployment or running of the container 710, (ii) a new instance of the software image 702 or a new instance of a new version of the software image 702 be run, and (iii) a new container be deployed.

In order to generate and deploy the containers, the system 700 may leverage one or more container engines or technologies such as, for example, Docker and/or CoreOS rkt. In order to arrange the containers to perform a variety of different server functions, the system 100 may leverage one or more container orchestration engines (COEs) such as, for example, Kubernetes, Mesos, and/or Docker Swarm.

The system 700 includes a host server 714, a management system 720, and a stateful set 712. The system 700 may further include database services 730 and file services 736. The host server 714 may communicate with the stateful set 712 and/or the management system 720 over a network 740. The database services 730 and the file services 736 may send data to, receive data from, or communicate with the stateful set 712 over the network 740.

In some implementations, the system 700 is the system 600 as shown in FIG. 6. In these implementations, the container 710 may be the container 610 as shown in FIG. 6. In these implementations, the running instance of the software image 702 may be the running instance of the software image 603a as shown in FIG. 6. Accordingly, the running instance of the software image 702 may be configured to both pull configuration information and resources, as well as be configured to receive resources pushed to it.

The management system 720 may be a computing system. The management system 720 may include one or more computing devices. The management system 720 may be accessible to one or more system developers, operators, and/or administrators. In some implementations, the management system 720 is the management system 620 as shown in FIG. 6.

The host server 714 is a server system and can include one or more computing devices. In some implementations, the host server 714 is located on the premises of a customer, e.g. on-premises. In other implementations, the host server 714 is not located on the premise of a customer, e.g. off-premises. In these implementations, the host server 714 may be part of a cloud provider, e.g. a third-party server system, such as, for example, Amazon Web Services (AWS), Microsoft Azure, or Google Cloud Platform (GCP). In some implementations, the host server 714 and the management system 720 are part of single computer system. In some implementations, the host server 714 is the host server 614 as shown in FIG. 6.

The network 740 can include public and/or private networks and can include the Internet. In some implementations, the network 740 is the network 640 as shown in FIG. 6.

The stateful set 712 represents a persistent, container-based environment. The stateful set 712 may be configured to deploy stateful applications and/or clustered applications that save data to persistent storage. The stateful set 712 may be hosted by the host server 714. The stateful set 712 may be hosted by a server or server environment different than the host server 714. The stateful set 712 may receive data from, send data to, or communicate with the database services 730 and the file services 736. The stateful set 712 may receive data from, send data to, or communicate with the database services 730 and the file services 736 over the network 740. In some implementations, the stateful set 712 is the stateful set 605a as shown in FIG. 6.

The database services 730 may be a persistent data storage. The database services 730 may include various database services drivers including the driver 732. In some implementations, the database services 730 is the database services 630 as shown in FIG. 6.

The file services 736 may be a persistent data storage. The file services 736 may include various configuration settings including the configuration settings 738. In some implementations, the file services 736 is the file services 636 as shown in FIG. 6.

As shown in FIG. 7, the container 710 is deployed on the host server 714 and is running an instance of the software image 702. The software image 702 may be configured to receive data from outside the container 710. For example, the software image 702 may be configured to receive data pushed to it from a stateful set 712. The stateful set 712 may be external to the container 710 (e.g., running instance of the software image 702).

The software image 702 may be further configured to look outside of the container 710 while the container 710 is running. In looking outside of the container 710, the software image 702 may use a reference 706. The reference 706 may point the software image 702 to a configuration file 704. The reference 706 may be, for example, a reference, a pointer, or a link to the configuration file 704. The configuration file 704 may instruct the software image 702 to perform various actions.

Resources may be pushed to the running instance of the software image 702 in response to a script being run. For example, a script 722 may be provided by the management system 720 and run within the stateful set 712. Upon the running of the script 722 within the stateful set 712, one or more resources may be pushed to the running instance of the software image 702. For example, upon the running of the script 722 within the stateful set 712, the driver 732 and the configuration settings 738 are pushed to the running instance of the software image 702.

Resources may be pushed to the running instance of the software image 702 in response to a determination that new or updated resources. For example, the database services 730 may receive or otherwise obtain a new version of the driver 732, or a new or different driver to replace the driver 732. The database services 730 may send an indication of this new or updated driver to the host server 714. Based on receiving this indication, the host server 714 may determine that a new or updated driver is available, that the new or updated driver should be pulled into the stateful set 712, and that this new or updated driver should be pushed to the running instance of the software image 702. The file services 736 may send a similar indication to the host server 714 when, for example, new configuration settings are received by the file services 736 or otherwise obtained by the file services 736. The indication sent to the host server 714 may include the new or updated resources themselves. For example, the database services 730 may send the new or updated driver to the host server 714 to be included in the stateful set 712.

As shown, in response to running the script 722 within the stateful set 712, the host server 714 retrieves the driver 732. Retrieving the driver 732 may include the host server 714 identifying the driver 732 within the stateful set 712. Retrieving the driver 732 may include the host server 714 identifying the driver 732 outside of the stateful set 712 and placing the driver 732 within the stateful set 712. The host server 714 may retrieve the driver 732 over the network 740. Retrieving the driver 732 may include identifying the driver 732 within the database services 730 and requesting the driver 732 from the database services 730.

Once the driver 732 is retrieved, per the script 722, the host server 714 installs the driver 732 on the running instance of the software image 702 and/or on the container 710.

Per the script 722, the host server 714 retrieves the configuration settings 738. Retrieving the configuration settings 738 may include the host server 714 identifying the configuration settings 738 within the stateful set 712. Retrieving the configuration settings 738 may include the host server 714 identifying the configuration settings 738 outside of the stateful set 712 and placing the configuration settings 738 within the stateful set 712. The host server 714 may retrieve the configuration settings 738 over the network 740. Retrieving the configuration settings 738 may include identifying the configuration settings 738 within the file services 736 and requesting the configuration settings 738 from the file services 736.

Once the configuration settings 738 are retrieved, per the script 722, the host server 714 updates the configuration settings of the running instance of the software image 702 and/or of the container 710.

In some implementations, the host server 714 may make a determination as to whether the driver 732 and/or the configuration settings 738 should be pushed to the running instance of the software image 702 and/or the container 710. For example, the host server 714 may compare the driver 732 with a list of one or more drivers currently installed on the running instance of the software image 702 and/or the container 710. If the driver 732 is not currently installed, then the host server 714 will proceed to install the driver 732 in accordance with the script 722. If the driver 732 is already installed, the host server 714 may abort the script 722 and/or skip the installation step of the script 722. As another example, the host server 714 may compare the configuration settings 738 with configuration settings currently implemented by the running instance of the software image 702 and/or the container 710. If the configuration settings 738 are not currently implemented, then the host server 714 will proceed to update the configuration settings in accordance with the script 722. If the configuration settings 738 are already implemented, the host server 714 may abort the script 722 and/or skip the update configuration settings step of the script 722.

As discussed in more detail with respect to FIG. 6, the software image 702 may look outside of the container 710 to the configuration file 704 using the reference 706. The configuration file 704 may include various parameters, may include an indication of the software image 702, may include instructions to pull the software image 702 or a different software image from a collection of images stored on a repository, etc. The parameters within the configuration file 704 may include, for example, a cache size, capacity limits, port assignments, etc.

Here, the configuration file 704 does not point to the driver 732 and the configuration settings 738. Had the configuration file 704 been pointing to the driver 732, then the driver 732 may have already been installed on the running instance of the software image 702 and/or the container 710. Similarly, had the configuration file 704 been pointing to the configuration settings 738 may have already been implemented on the running instance of the software image 702 and/or the container 710.

Because in this instance the configuration file 704 does not point to the driver 732 and the configuration settings 738, a question could arise later on, e.g. when the software image 702 or the container 710 reads the configuration file 704, as to whether one or more resources that the configuration file 704 is pointing to should replace the driver 732 and/or the configuration settings 738. One solution is to dynamically update the configuration file 704 to reflect the resources pushed to the running instance of the software image 702 and/or the container 710.

In some implementations, the software image 702 and/or the container 710 can dynamically update the configuration file 704. The configuration file 704 can be updated to reflect the resources that have been pushed to the running instance of the software image 702 and/or the container 710. In these implementations, the software image 702 and/or the container 710 may be configured to detect when resources are pushed to them as opposed to be pulled, for example, after reading the configuration file 704.

As an example, the software image 702 and/or the container 710 may dynamically update the configuration file 704 to include a reference, link, or pointer to the driver 732. This reference, link, or pointer to the driver 732 may replace a reference, link, or pointer to a different driver, e.g. a driver that may have been previously installed on the running instance of the software image 702 and/or the container 710.

As another example, the software image 702 and/or the container 710 may dynamically update the configuration file 704 to include the configuration settings 738 and/or include a reference, link, or pointer to the configuration setting 738. The configuration settings 738 may be incorporated into the configuration file 704 itself. If the configuration settings 738 are incorporated into the configuration file 704 itself, they may replace all or a portion of configuration settings currently existing within the configuration file, e.g. configuration settings that may have been previously implemented by the software image 702 and/or the container 710. A reference, link, or pointer to the configuration settings 738 may replace a reference, link, or pointer to configuration settings 738, e.g. configuration settings that may have been previously implemented by the software image 702 and/or the container 710.

In some implementations, the host server 714 dynamically updates the configuration file 704 instead of the software image 702 and/or the container 710.

Figure 8A:
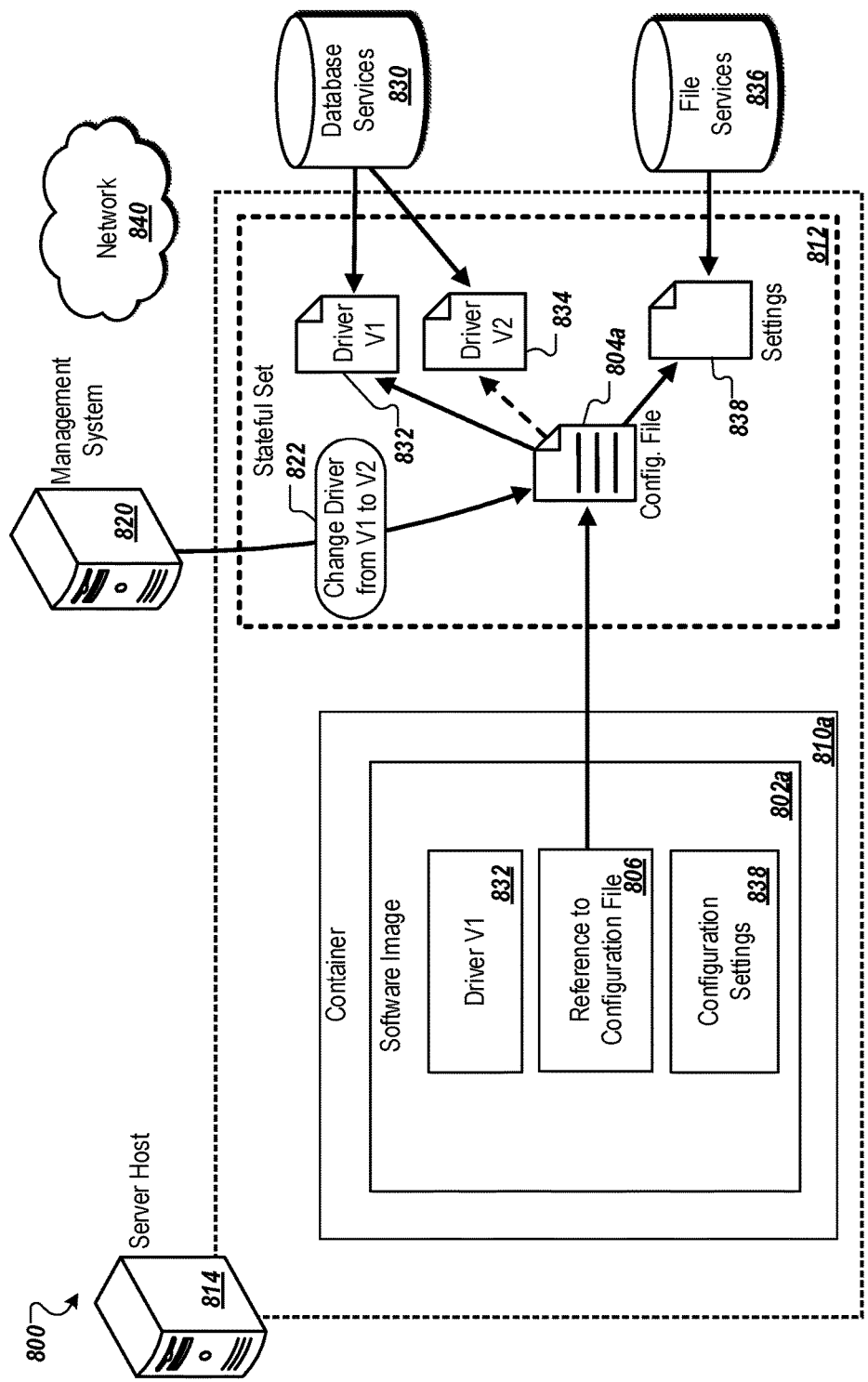
FIGS. 8A-8B are diagrams illustrating an example of dynamically updating a container with external elements.
Figure 8B:
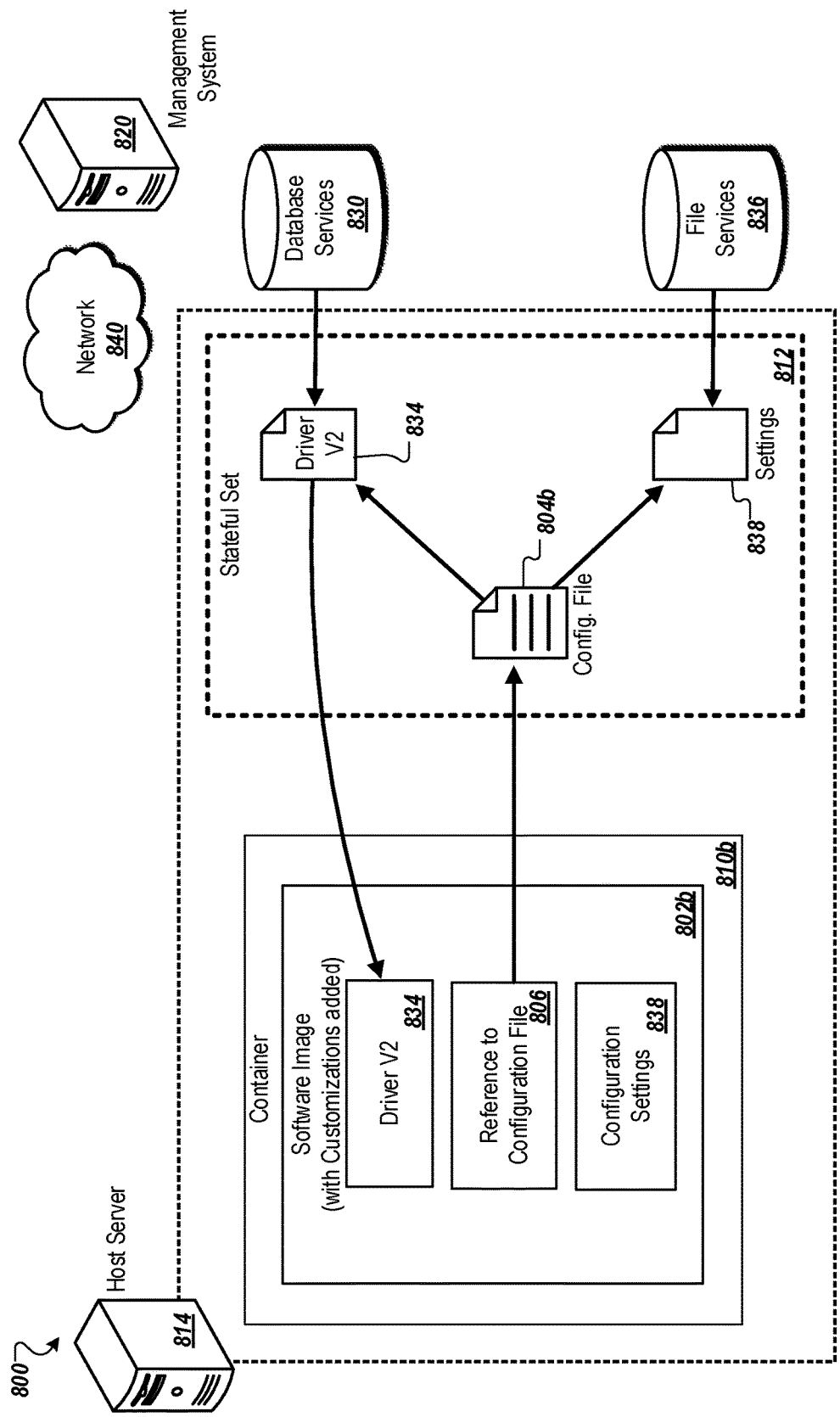

FIGS. 8A-8B are diagrams illustrating an example system 800 for integrating containers with external elements and an example process for integrating containers with external elements.

The system 800 includes a host server 814, a management system 820, and a stateful set 812. The system 800 may further include database services 830 and file services 836. The host server 814 may communicate with the stateful set 812 and/or the management system 820 over a network 840. The database services 830 and the file services 836 may send data to, receive data from, or communicate with the stateful set 812 over the network 840.

The system 800 may be the system 600 shown in FIG. 6 and/or the system 700 shown in FIG. 7. Accordingly, the host server 814 may be the host server 614 shown in FIG. 6 and/or the host server 714 shown in FIG. 7. The management system 820 may be the management system 620 shown in FIG. 6 and/or the management system 720 shown in FIG. 7. The network 840 may be the network 640 shown in FIG. 6 and/or the network 740 shown in FIG. 7. The stateful set 812 may be the stateful set 605*a* shown in FIG. 6 and/or the stateful set 712 shown in FIG. 7. The database services 830 may be the database services 630 shown in FIG. 6 and/or the database services 730 shown in FIG. 7. The file services 836 may be the file services 636 shown in FIG. 6 and/or the file services 736 shown in FIG. 7.

In FIG. 8A, the management system 820 sends instructions 822 to the stateful set 812a. The instructions 822 provide for modifying a configuration file 804a. Specifically, the instructions 822 provide for modifying the configuration file 804a so that the configuration file 804a will now refer to a second version of a driver (driver 834) instead of a first version of the driver (driver 832). As shown, the configuration file 804a currently points to the driver 832. A dashed line to the driver 834 represents the effects that the instructions 822 will have in modifying the configuration file 804a.

At the time the instructions 724 are provided by the management system 820, a container 810a has already been deployed on the host server 814 and is running on the host server 814. The container 810a is running an instance of a software image 802a. The running instance of the software image 802a includes a reference 806 to the configuration file 804a, configuration settings 838, and the driver 832 installed on the running instance of the software image 802a. At the time the instructions 822 are provided by the management system 820, the driver 832 and configuration settings 838 found in the stateful set 812 have already been incorporated into the running instance of the software image 802a. software image As discussed above with respect to FIGS. 6-7, the software image 802a is configured to look outside of the container 810a while the container 810a is running. In looking outside of the container 810a, the software image 802a may use a reference 806. The reference 806 may point the software image 802a to the configuration file 804a. The reference 806 may be, for example, a reference, a pointer, or a link to the configuration file 804a. The configuration file 804 may instruct the software image 603a to perform The instructions provided by the management system 820 may be instructions to effectuate changes to the one or more configuration files and/or resources within the stateful set 812. The changes to the one or more configuration files and/or resources may be instructions to modify the one or more configuration files and/or resources, instructions to replace the one or more configuration files and/or resources, and/or instructions to pull additional resources into the stateful set. For example, here, the instructions 822 are instructions to modify the configuration file 804a. As another example, the management system 820 may provide instructions to retrieve one or more resources from external databases such as the database services 830 and/or the file services 836. The management system 820 may provide these instructions in the form of a script.

The instructions 822 may be generated and sent to the stateful set 812 manually. For example, the instructions 822 may be generated and sent to the stateful set 812 by one or more system administrators, operators, and/or developers.

The instructions 822 may be generated and sent to the stateful set 812 automatically based on a triggering event. For example, the instructions 822 may be automatically sent to the stateful set 812 in order to update the configuration file 804a in response to a determination that a new driver 834 is available. As another example, instructions may automatically be sent by the management system 820 in response to a change to changes in settings or preferences on management system 820, e.g. in response to a modification to default or standard configuration settings that should be used for the application and/or function corresponding with the container 810a.

In some implementations, instead of sending instructions, the management system 820 sends one or more replacement configuration files and/or resources to the stateful set 812. For example, the management system 820 may send a new configuration file to replace the configuration file 804a. As another example, the management system 820 may send new configuration setting to replace the configuration settings 838a.

In FIG. 8B, the one or more configuration files and/or resources are modified or replaced in accordance with the instructions 822 shown in FIG. 8A, and one or more new resources are either pulled or pushed to the running instance of the software image 802a (shown in FIG. 8A) resulting in a modified software image 802b.

As shown, the modified configuration file 804b points to the driver 834. The configuration file 804b points to the driver 834 instead of the driver 832 shown in FIG. 8A.

In modified software image 802b may result from the driver 834 being pulled into the running instance of the software image 802a and/or the container 810a shown in FIG. 8A. The software image 802a may look outside of the container 810a using the reference 806 as outlined above with respect to FIGS. 6-7. The software image 802a may use the reference 806 to identify the modified configuration file 804b so that it can read the modified configuration file 804b. The software image 802a may use the reference 806 and read the modified configuration file 804b in response to the passing of a particular amount of time since last reading the modified configuration file 804b, e.g. when the software image 802a is configured to read the modified configuration file 804b periodically. The software image 802a may use the reference 806 and read the modified configuration file 804b in response to the detected occurrence of a triggering event, e.g. the detection of a change to the configuration file 804a as shown in FIG. 8A, a detection of the instructions 822 as shown in FIG. 8A being provided by the management system 820, a detection of a change to one or more resources within the stateful set 812, a determination that a webpage has been loaded, etc.

Upon reading the modified configuration file 804b, the software image 802a shown in FIG. 8A is directed to the driver 834. The software image 802a may proceed to retrieve the driver 834 and install it on the running instance of the modified software image 802a and/or the container 810a shown in FIG. 8A, resulting in the modified software image 802b.

In some implementations, resources may be pushed to the running instance of the software image 802a and/or the container 810a shown in FIG. 8A in accordance with the methods described above with respect to FIG. 7. The host server 814 may push resources to the running instance of the software image 802a and/or the container 810a. For example, in response to detecting that the configuration file 804a shown in FIG. 8A has been modified such that it points to the driver 834, the host server 814 may automatically retrieve the driver 834 and install it on the running instance of the modified software image 802a and/or the container 810a, resulting in the modified software image 802b.

In these implementations, the host server 814 may determine whether the driver 834 has already been installed on the running instance of the software image 802a and/or the container 810a as shown in FIG. 8A. For example, the host server 814 may compare the driver 834 with a list of one or more drivers that are currently installed on the running instance of the software image 802a and/or the container 810a. If the driver 834 is not listed, the host server 814 may retrieve the driver 834 and install it on the running instance of the software image 802a and/or the container 810a, resulting in the modified software image 802b and/or the modified container 810b.

As a result of the driver 834 being retrieved and installed, the driver 834 effectively replaces the driver 832 shown in FIG. 8A on the modified software image 802b. In some implementations, replacing the driver 832 with the driver 834 involves uninstalling the driver 832.

As shown, the modified software image 802b continues to use the same configuration settings 838 as used by the software image 802a shown in FIG. 8A.

Figure 9:
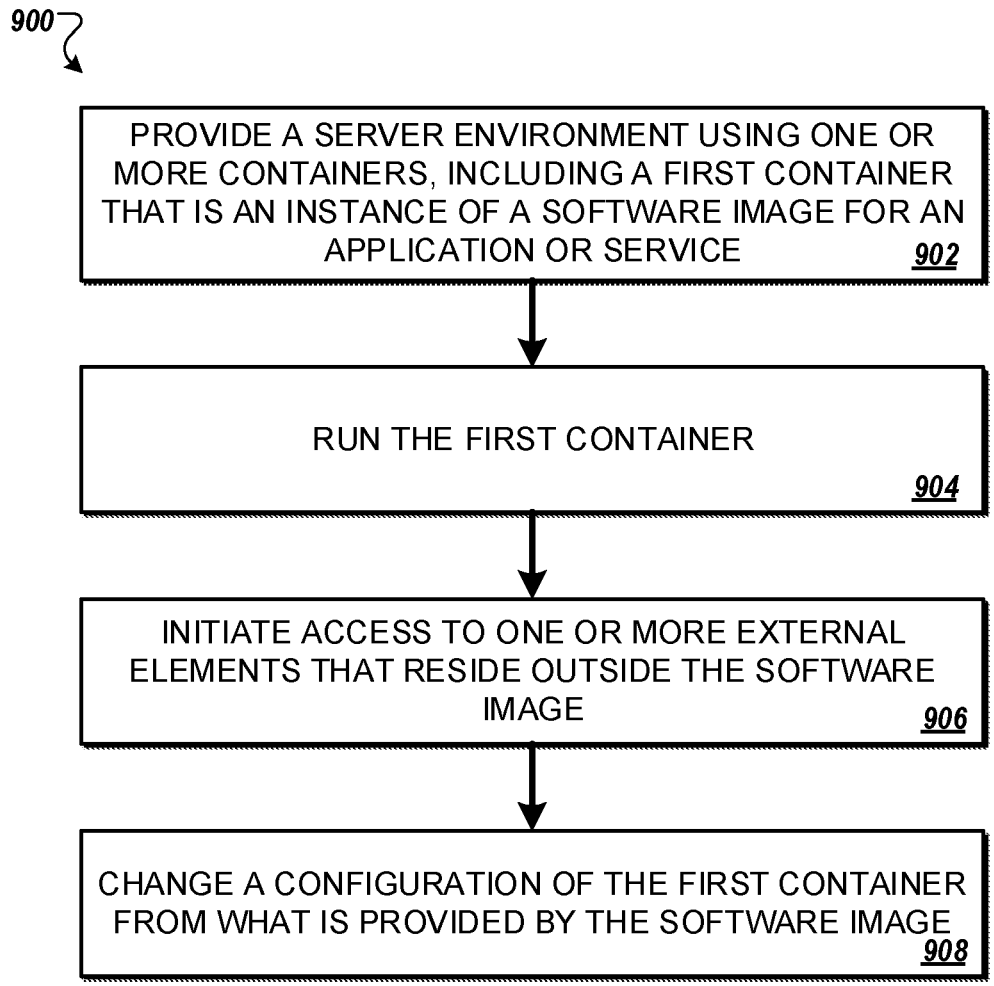
FIG. 9 is a flow diagram showing an example of a process 900 for updating a container with external elements.

FIG. 9 is a flow diagram showing an example of a process 900 for updating a container with external elements. The process 900 shows how a container of a container-based server environment may be updated or changed using elements that are external with respect to the software image of the container. Briefly, in a server environment, an initialization script can be run to create and start a container. The container may include a reference which the container may use to look outside of the container to external elements. These external elements may be used by the container to obtain additional resources and customization. For example, these external elements may be used to update the configuration of container, to pull data or objects into the container, to update or change objects within the container, etc. This process enables the system to effectively update a container through changes to external elements without the need to generate a new software image or a new version of a software image, and creating and running a new container for that software image.

The system provides a server environment using one or more containers (902). The one or more containers can include a first container that is an instance of a software image for an application or service. The one or more containers can be run on a cluster of multiple processing nodes, with resources of the cluster of multiple processing nodes being allocated among the respective containers. The processing nodes may represent actual processors or virtual processing nodes. The software image may include a reference. The reference may be a reference, a pointer, or a link to an external element, such as a configuration file, located outside of the software image and the first container.

The system runs the first container (904). This may occur automatically, for example, as triggered by the system. This may occur manually, for example, as initiated by an administrator having access to the system or another system user. To run the first container, the system may run an initialization script that corresponds with the software image. The first container may be configured as a result of running the initialization script.

The first container initiates access to one or more external elements that reside outside the software image (906). For example, the first container may use a link, pointer, or other reference from within the first container, e.g., as provided by the software image, to access or obtain an element outside the container. The accessed one or more elements may be in the stateful set for the first container or may not be in the stateful set (e.g., may be provided by a third-party system, from another running container, from another server system, etc.) Access to the one or more external elements that reside outside the software image may be initiated in response to the first container being run. The external elements can include, for example, executable or interpretable software (e.g., code, software modules, libraries, drivers, etc.), data, and configuration information. Some or all of the external elements may reside within a stateful set of the first container. The external elements on the stateful set may be updated, replaced, or removed over time. For example, the software image may contain software, data, and/or configuration information initially consistent with the external elements. However, an external element may be changed, for example, by a system administrator or replaced, for example, with a new version, resulting in the software image no longer being consistent with respect to the external elements.

In some cases, the software image includes a reference to a source of data outside the first container. In these cases, access to the one or more external elements is initiated based on the reference in the software image. In these cases, the source of data may be a configuration file corresponding to the container or the software image. In these cases, the configuration file may point to a location external to the software image for retrieval of a software module. In these cases, the first container may be configured to access the configuration file each time a condition is satisfied in order to determine whether further changes to the first container are needed according to the current contents of the configuration file. For example, the condition may involve invocation of a particular function performed by the first container. As another example, the condition may involve the passing of a preset or dynamic amount of time since the configuration file was last accessed.

In some cases, access to the one or more external elements is initiated upon starting the first container. For example, access may be initiated when the first container is run for the first time.

The first container causes a change in a configuration of the first container from what is provided by the software image (908). The configuration of the first container may be changed in response to the first container being run and the first container accessing one or more external elements. The configuration of the first container may be changed, for example, when the first container accesses an external element containing configuration information that is inconsistent with the current configuration of the first container.

In some cases, changing the configuration of the first container involves retrieving an element into the first container that is not included in the software image and incorporating the retrieved element into the first container. In these cases, the incorporated element may include a library, an executable, a driver, or code. An executable may be, for example, executable software. Executable software may include executable code, executable software modules, executable libraries, executable drivers, etc.

In some cases, the software image includes a first software module and is configured to use the first software module. In these cases, changing the configuration of the first container involves the first container configuring itself to obtain and use a second software module instead of the first software module that is included in the software image. In these cases, the second software module may be an upgraded version of the first software module. A software module may be a service or an application.

In cases where the software image includes a reference to a configuration file that points to a location external to the software image for retrieval of a software module, changing the configuration of the first container involves reading contents of the configuration file based on a reference in the software image to the configuration file located outside the software image, and, based on the contents of the configuration file, retrieving the software module from the location external to the software image. In these cases, changing the configuration of the first container may further involve incorporating the retrieved software module into the first container. In these case, the first container may perform additional operations. For example, the system, by the first container, may determine one or more settings from the configuration file. In this example, changing the configuration of the first container involves applying to the first container the one or more settings determined from the configuration file. As another example, the system, by the first container, may detect a change to the configuration file or receive a notification that the configuration file has changed while the first container is running. In response to detecting the change or receiving the notification, the system, by the first container, may initiate access to the first container and change the configuration of the first container based on the changed contents of the configuration file.

In some cases, changing the configuration of the first container is performed upon starting the first container. For example, changing the configuration of the first container may be initiated when the first container is run for the first time and has accessed one or more external elements.

In some cases, the system associates a stateful set of data with the first container. In these cases, the system may further store a copy of the stateful set of data in persistent storage such that the stored stateful set of data enables the server system to replicate, for another container running an instance of the software image, a current state of the first container. In these cases, the one or more external elements may be located in the stateful set of data. Alternatively, the one or more external elements may be located outside the stateful set of data and may be accessed over a computer network. In these cases, one or more first external elements may be located in the stateful set of data and one or more second external elements may be located outside the stateful set of data.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
providing, by a server system, a server environment using one or more containers, the one or more containers comprising a first container that is an instance of a software image of an application or service, wherein the software image includes a reference to a configuration file corresponding to the first container or the software image, the configuration file being located outside the first container, wherein the configuration file indicates a location external to the software image for retrieval of a software module; and
running the first container such that the running first container performs operations including:
initiating access, by the running first container, to the configuration file that resides outside the software image and outside the running first container, wherein the access to the configuration file is initiated based on the reference in the software image; and
changing, by the running first container, a configuration of the running first container from what is provided by the software image based on the configuration file, wherein changing the configuration of the running first container comprises:
reading contents of the configuration file located outside the software image based on the reference in the software image to the configuration file;
based on the contents of the configuration file, retrieving the software module from the location external to the software image; and
incorporating the retrieved software module into the running first container.

2. The method of claim 1, wherein the incorporated software module comprises a library, an executable, a driver, or code.

3. The method of claim 1, wherein the software image includes a first software module and is configured to use the first software module,
wherein the retrieved software module is a second software module, and
wherein changing the configuration of the running first container comprises the running first container configuring itself to obtain and use the second software module instead of the first software module that is included in the software image.

4. The method of claim 3, wherein the second software module is an upgraded version of the first software module.

5. The method of claim 1, wherein the operations comprise determining, by the first container, one or more settings from the configuration file;
wherein changing the configuration of the first container comprises applying, to the running first container, the one or more settings determined from the configuration file.

6. The method of claim 1, wherein the operations comprise, while the first container is running:
detecting, by the running first container, a change to the configuration file or receiving, by the running first container, a notification that the configuration file has changed;
in response to detecting the change or receiving the notification, initiating, by the running first container, access to the first container and changing the configuration of the first container based on the changed contents of the configuration file.

7. The method of claim 1, wherein the running first container is configured to access the configuration file each time a condition is satisfied in order to determine whether further changes to the running first container are needed according to the current contents of the configuration file.

8. The method of claim 7, wherein the condition comprises invocation of a particular function performed by the running first container.

9. The method of claim 1, wherein the server system associates a stateful set of data with the running first container, and the method comprises the server system storing a copy of the stateful set of data in persistent storage such that the stored stateful set of data enables the server system to replicate, for another container running an instance of the software image, a current state of the running first container.

10. The method of claim 9, wherein the configuration file is located in the stateful set of data.

11. The method of claim 9, wherein the configuration file is located outside the stateful set of data and is accessed over a computer network.

12. The method of claim 1, wherein initiating access to the configuration file and changing the configuration of the running first container are performed upon starting the first container.

13. A system comprising:
one or more computers; and
one or more computer-readable media storing instructions that, when executed, cause the one or more computers to perform operations comprising:
providing, by a server system, a server environment using one or more containers, the one or more containers comprising a first container that is an instance of a software image of an application or service, wherein the software image includes a reference to a configuration file corresponding to the first container or the software image, the configuration file being located outside the first container, wherein the configuration file indicates a location external to the software image for retrieval of a software module; and
running the first container such that the running first container performs operations including:
initiating access, by the running first container, to the configuration file that resides outside the software image and outside the running first container, wherein the access to the configuration file is initiated based on the reference in the software image; and
changing, by the running first container, a configuration of the running first container from what is provided by the software image based on the configuration file, wherein changing the configuration of the running first container comprises:
reading contents of the configuration file located outside the software image based on the reference in the software image to the configuration file;
based on the contents of the configuration file, retrieving the software module from the location external to the software image; and
incorporating the retrieved software module into the running first container.

14. The system of claim 13, wherein the incorporated software module comprises a library, an executable, a driver, or code.

15. The system of claim 13, wherein the software image includes a first software module and is configured to use the first software module, and
wherein the retrieved software module is a second software module, and
wherein changing the configuration of the running first container comprises the running first container configuring itself to obtain and use the second software module instead of the first software module that is included in the software image.

16. One or more non-transitory computer-readable media storing instructions that, when executed by one or more computers, cause the one or more computers to perform operations comprising:
providing, by a server system, a server environment using one or more containers, the one or more containers comprising a first container that is an instance of a software image of an application or service, wherein the software image includes a reference to a configuration file corresponding to the first container or the software image, the configuration file being located outside the first container, wherein the configuration file indicates a location external to the software image for retrieval of a software module; and
running the first container such that the running first container performs operations including:
initiating access, by the running first container, to the configuration file that resides outside the software image and outside the running first container, wherein the access to the configuration file is initiated based on the reference in the software image; and
changing, by the running first container, a configuration of the running first container from what is provided by the software image based on the configuration file, wherein changing the configuration of the running first container comprises:
reading contents of the configuration file located outside the software image based on the reference in the software image to the configuration file;
based on the contents of the configuration file, retrieving the software module from the location external to the software image; and
incorporating the retrieved software module into the running first container.

* * * * *